US012620691B2

(12) United States Patent
Wu

(10) Patent No.: US 12,620,691 B2
(45) Date of Patent: May 5, 2026

(54) BASE STATION ANTENNAS HAVING RADIATING ELEMENTS WITH ACTIVE AND/OR CLOAKED DIRECTORS FOR INCREASED DIRECTIVITY

(71) Applicant: Outdoor Wireless Networks LLC, Claremont, NC (US)

(72) Inventor: Bo Wu, Allen, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 390 days.

(21) Appl. No.: 18/006,678

(22) PCT Filed: Feb. 16, 2022

(86) PCT No.: PCT/CN2022/076395
§ 371 (c)(1),
(2) Date: Jan. 24, 2023

(87) PCT Pub. No.: WO2023/155055
PCT Pub. Date: Aug. 24, 2023

(65) Prior Publication Data

US 2024/0258684 A1 Aug. 1, 2024

(51) Int. Cl.
*H01Q 1/52* (2006.01)
*H01Q 1/24* (2006.01)
(Continued)

(52) U.S. Cl.
CPC ............. *H01Q 1/246* (2013.01); *H01Q 1/523* (2013.01); *H01Q 21/26* (2013.01); *H01Q 3/46* (2013.01)

(58) Field of Classification Search
CPC ........ H01Q 1/246; H01Q 1/523; H01Q 19/10; H01Q 19/30; H01Q 21/06; H01Q 21/24–26
See application file for complete search history.

(56) References Cited

U.S. PATENT DOCUMENTS 8,416,142 B2 4/2013 Goettl
8,994,602 B2 3/2015 Plet et al.
(Continued)

FOREIGN PATENT DOCUMENTS

CN 206774669 U 12/2017
CN 112335120 A 2/2021
(Continued)

OTHER PUBLICATIONS

"International Search Report and Written Opinion of the International Searching Authority", International Application No. PCT/CN2022/076395, Oct. 26, 2022, 12 pp.

*Primary Examiner* — Hasan Islam
(74) *Attorney, Agent, or Firm* — Myers Bigel, P.A.

(57) ABSTRACT

Base station antenna include an RF port, a reflector, a linear array of radiating elements mounted to extend forwardly from the reflector, and a feed network that electrically connects the RF port to each of the radiating elements in the linear array. The radiating elements are configured to operate in a first frequency band. A first of the radiating elements is a cross-dipole radiating element that includes a feed stalk, a cross-dipole radiator that includes a first −45° polarization dipole radiator and a first +45° polarization dipole radiator mounted on the feed stalk, and an active director that includes a second −45° polarization dipole radiator and a second +45° polarization dipole radiator mounted forwardly of the cross-dipole radiator. Both the cross-dipole radiator and the active director are coupled to the feed network.

20 Claims, 12 Drawing Sheets

(51) Int. Cl.
*H01Q 21/26* (2006.01)
*H01Q 3/46* (2006.01)

(56) References Cited

U.S. PATENT DOCUMENTS

| | | | |
|---|---|---|---|
| 9,263,798 | B1 | 2/2016 | Piazza et al. |
| 10,770,803 | B2 | 9/2020 | Varnoosfaderani et al. |
| 11,637,373 | B2 | 4/2023 | Chen et al. |
| 11,901,638 | B2 * | 2/2024 | Chainon ................ H01Q 9/285 |
| 12,322,876 | B2 | 6/2025 | Chen et al. |
| 2017/0310009 | A1 * | 10/2017 | Isik ...................... H01Q 19/108 |
| 2017/0365923 | A1 | 12/2017 | Schmutzler et al. |
| 2018/0323513 | A1 | 11/2018 | Varnoosfaderani et al. |
| 2020/0303820 | A1 | 9/2020 | Jang et al. |
| 2020/0373668 | A1 * | 11/2020 | Wu ........................ H01Q 9/285 |
| 2021/0265731 | A1 | 8/2021 | Plet et al. |
| 2022/0158360 | A1 | 5/2022 | Li et al. |
| 2022/0190487 | A1 | 6/2022 | Sun et al. |

FOREIGN PATENT DOCUMENTS

| | | | |
|---|---|---|---|
| EP | 3614491 | A1 | 2/2020 |
| JP | 2014064103 | A | 4/2014 |
| KR | 101829816 | B1 | 2/2018 |
| WO | 2013104108 | A1 | 7/2013 |
| WO | 2018076192 | A1 | 5/2018 |
| WO | 2018202304 | A1 | 11/2018 |
| WO | 2020191605 | A1 | 10/2020 |

* cited by examiner

BASE STATION ANTENNAS HAVING RADIATING ELEMENTS WITH ACTIVE AND/OR CLOAKED DIRECTORS FOR INCREASED DIRECTIVITY

CROSS-REFERENCE TO RELATED APPLICATION

The present application is a 35 U.S.C. § 371 national stage application of PCT Application No. PCT/CN2022/076395, filed on Feb. 16, 2022, the disclosure of which is hereby incorporated herein in its entirety as if set forth fully herein.

FIELD

The present invention relates to radio communications and, more particularly, to base station antennas for cellular communications.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas (which may be referred to as "sector" base station antennas) provide coverage to each of the sectors. The base station antennas are often mounted on a tower, with the radiation beam ("antenna beam") that is generated by each base station antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular the plane defined by the horizon. Reference will also be made to the azimuth plane, which is a plane that bisects the base station antenna that is parallel to the plane defined by the horizon, and to the elevation plane, which is a plane extending along the boresight pointing direction of the antenna that is perpendicular to the azimuth plane.

A very common base station configuration is a so-called "three sector" configuration in which the cell is divided into three 120° sectors in the azimuth plane. A sector base station antenna is provided for each sector. In a three sector configuration, the antenna beams generated by each base station antenna typically have a Half Power Beamwidth ("HPBW") in the azimuth plane of about 65° so that the antenna beams provide good coverage throughout a 120° sector. Three of these base station antennas will therefore provide full 360° coverage in the azimuth plane. Typically, each base station antenna will include a so-called linear array of radiating elements that includes a plurality of radiating elements that are arranged in a vertically-extending column. Each radiating element may have a HPBW of approximately 65°. By providing a column of radiating elements extending along the elevation plane, the elevation HPBW of the antenna beam may be narrowed to be significantly less than 65°, with the amount of narrowing increasing with the length of the column in the vertical direction.

As demand for cellular service has grown, cellular operators have upgraded their networks to increase capacity and to support new generations of service. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more different types or generations of cellular service. However, due to local zoning ordinances and/or weight and wind loading constraints, there is often a limit as to the number of base station antennas that can be deployed at a given base station. To reduce the number of antennas, many operators deploy antennas that communicate in multiple frequency bands to support multiple different cellular services.

There is considerable interest in base station antennas that include two linear arrays of "low-band" radiating elements that are used to support service in some or all of the 617-960 MHz frequency band. The antenna beams generated by such low-band linear arrays tend to penetrate buildings and other structures much more readily than arrays of radiating elements that operate in higher cellular frequency bands, and hence low-band service may be very important for providing high quality service. Base station antennas that include two low-band linear arrays typically also include at least two additional linear arrays of "mid-band" radiating elements that are used to provide service in some or all of the 1427-2690 MHz frequency band, and may also include one or more multi-column arrays of radiating elements that operate in the higher portion of the mid-band frequency range (e.g., the 2.3-2.7 GHz frequency range) or in a portion of the 3.2-5.8 GHz "high-band" frequency range.

FIG. 1 is a schematic front view of a conventional base station antenna 10 (with the radome thereof removed) that includes two linear arrays 12-1, 12-2 of low-band radiating elements 14 and two linear arrays 22-1, 22-2 of high-band radiating elements 24. Each radiating element is depicted in FIG. 1 (and other of the figures herein) as a large or small "X" to show that the radiating elements are dual-polarized cross-dipole radiating elements. The two linear arrays 22-1, 22-2 of mid-band radiating elements 24 are mounted in between the two linear arrays 12-1, 12-2 of low-band radiating elements 14 so that all four linear arrays are mounted in side-by-side fashion. It should be noted that herein, when multiple like or similar elements are provided, they may be labelled in the drawings using a two-part reference numeral (e.g., the linear arrays 12-1, 12-2). Such elements may be referred to herein individually by their full reference numeral (e.g., linear array 12-2) and may be referred to collectively by the first part of their reference numeral (e.g., the linear arrays 12).

Antennas having the configuration shown in FIG. 1 may be used in a variety of applications including 4×4 multi-input-multi-output ("MIMO") applications or as multi-band antennas that support cellular service in two different low-band frequency ranges (e.g., a 700 MHz low-band linear array 12-1 and an 800 MHz low-band linear array 12-2) and two different mid-band frequency ranges (e.g., an 1800 MHz mid-band linear array 22-1 and a 2100 MHz mid-band linear array 22-2). These antennas, however, are challenging to implement in a commercially acceptable manner because achieving a 65° azimuth HPBW antenna beam in the low-band typically requires low-band radiating elements 14 that are at least 200 mm wide. Consequently, when two arrays 12-1, 12-2 of low-band radiating elements 14 are placed side-by-side with two linear arrays 22-1, 22-2 of mid-band radiating elements 24 therebetween, as shown in FIG. 1, a base station antenna 10 having a width of nearly 500 mm may be required. Such large antennas may be heavy and have high wind loading. Moreover, base station antennas that have two low-band linear arrays often have somewhat larger azimuth HPBWs, which may provide acceptable coverage to the sector, but exhibit less directivity, and hence less antenna gain, than is desired for some applications.

The directivity of the low-band linear arrays may be increased by configuring the arrays to produce antenna beams having narrower beamwidths in the azimuth and/or elevation planes. Typically, the beamwidth in the elevation plane is controlled by the number of radiating elements included in the linear array, and this is set by customer requirements regarding the size of the cell. Thus, efforts to increase directivity typically focus on reducing the beamwidth of the generated antenna beams in the azimuth plane Various techniques have been suggested for reducing the azimuth beamwidth of the antenna beams generated by a pair of low-band linear arrays of a base station antenna. FIGS. 2A-2C are schematic views of three base station antennas that each include two arrays of low-band radiating elements, where each antenna uses a different technique to narrow the azimuth beamwidths of the antenna beams generated by the low-band linear arrays. The low-band linear arrays in these antennas include dual-polarized cross-dipole radiating elements that include first and second dipole radiators that transmit/receive signals at orthogonal (slant−45°/+45°) polarizations. The base station antennas depicted in FIGS. 2A-2C may, for example, also include two linear arrays of mid-band radiating elements that are positioned between the two arrays of low-band radiating elements (these mid-band linear arrays may be identical to the mid-band linear arrays 22-1, 22-2 depicted in FIG. 1).

Referring first to FIG. 2A, a conventional base station antenna 30 is depicted that includes first and second columns of low-band radiating elements 34. The base station antenna 30 may be identical to the base station antenna 10 of FIG. 1, except that two additional low-band radiating elements 34 are added to base station antenna 30, and the low-band radiating elements 34 are grouped differently to form the two low-band arrays 32-1, 32-2. To help highlight which low-band radiating elements 34 are in each array 32-1, 32-2, polygons have been drawn around each array. As shown in FIG. 2A, the first and second arrays 32-1, 32-2 of low-band radiating elements 36 are so-called "L-shaped" arrays 32-1, 32-2. In particular, the first array 32-1 includes the bottom five radiating elements 34 in the left-hand column as well as the bottom radiating element 34 in the right-hand column, while the second array 32-2 includes the top five radiating elements 34 in the right-hand column as well as the top radiating element 34 in the left-hand column. Thus, the first array 32-1 has an upside-down L-shape and the second array 32-2 has an L-shape. Since each array 32-1, 32-2 includes a radiating element 34 that is horizontally offset from the remaining radiating elements 34 in the array 32, the horizontal aperture of each array 32-1, 32-2 is increased, with a commensurate reduction in the azimuth beamwidth. One disadvantage, however, of this design is that it requires adding an extra radiating element 34 to each column, which increases the length and cost of the antenna 30.

FIG. 2B is a schematic front view of another conventional base station antenna 40 that increases the horizontal aperture without the need for adding an extra radiating element in each column. As shown in FIG. 2B, the base station antenna 40 includes two columns of low-band radiating elements 44. The radiating elements 44 form first and second so-called "Y-shaped" arrays 42-1, 42-2 (note that each array 42 is one radiating element short of actually having a "Y-shape"). The base station antenna 40 may be identical to the base station antenna 10 of FIG. 1, except that the bottom radiating element 44 in each column is switched to be part of the array 42 formed by the rest of the radiating elements 44 in the opposite column. Since each array 42-1, 42-2 includes a radiating element 44 that is in the opposite column, the horizontal aperture of each array 42-1, 42-2 is increased, with a commensurate reduction in the azimuth beamwidth. Moreover, the base station antenna 40 includes the same number of radiating elements 44 as does base station antenna 10, and hence does not suffer from the cost and size disadvantages associated with base station antenna 30. One disadvantage, however, of the design of base station antenna 40 is that the physical distance between the bottom two radiating elements 44 in each array 421, 42-2 is increased (since the physical distance is taken along a diagonal as opposed to simply being the vertical distance between the two radiating elements 44), and this results in off-axis grating lobes in the resultant radiation patterns formed by the first and second arrays 42-1, 42-2. These grating lobes reduce the gain of the antenna 40, and may also result in interference with neighboring base stations.

FIG. 2C is a schematic front view of another conventional base station antenna 50 that has low-band arrays with increased horizontal apertures. The base station antenna 50 is disclosed in U.S. Pat. No. 8,416,142 to Göttl. As shown in FIG. 2C, the base station antenna 50 includes first and second columns of dual-polarized cross-dipole low-band radiating elements 54. The radiating elements 54 in the left-hand column are part of a first array 52-1, and the radiating elements 54 in the right-hand column are part of a second array 52-2. The antenna 50 further includes first and second centrally located radiating elements 56-1, 56-2, which may be identical in design to the radiating elements 54. One dipole radiator of each centrally-located radiating element 56-1, 56-2 is part of the first array 52-1 and the other dipole radiator of each centrally-located radiating element 56-1, 56-2 is part of the second array 52-2. Thus, the first array 52-1 includes six dipole radiators for each polarization (namely the five dipole radiators at each polarization included in the radiating elements 54 in the first column, the +45° dipole radiator of centrally-located radiating elements 56-1, and the −45° dipole radiator of centrally-located radiating element 56-2). Likewise, the second array 52-2 includes six dipole radiators for each polarization (the five dipole radiators at each polarization included in the radiating elements 54 in the second column, the −45° dipole radiator of centrally-located radiating element 56-1, and the +45° dipole radiator of centrally-located radiating element 56-2). The centrally-located radiating elements 56-1, 56-2 act to narrow the azimuth beamwidth by increasing the horizontal aperture of each array 52-1, 52-2. This may allow for reduction in the size of the individual radiating elements 54, 56, and hence may allow the overall width of the antenna 50 to be reduced.

SUMMARY

Pursuant to embodiments of the present invention, base station antennas are provided that include an RF port, a reflector, a linear array of radiating elements mounted to extend forwardly from the reflector, the radiating elements configured to operate in a first frequency band, and a feed network that electrically connects the RF port to each of the radiating elements in the linear array. A first of the radiating elements is a cross-dipole radiating element that includes a feed stalk, a cross-dipole radiator that includes a first −45° polarization dipole radiator and a first +45° polarization dipole radiator mounted on the feed stalk, and an active director that includes a second −45° polarization dipole radiator and a second +45° polarization dipole radiator mounted forwardly of the cross-dipole radiator. Both the cross-dipole radiator and the active director are coupled to the feed network.

In some embodiments, the first of the radiating elements is configured to generate antenna beams having −45° and +45° polarizations that have beamwidths in the azimuth plane that are narrower than antenna beams having −45° and +45° polarizations that are generated by the cross-dipole radiator alone.

In some embodiments, the active director is mounted forwardly of the cross-dipole radiator at least $1/10^{th}$ of a wavelength corresponding to a center frequency of the first frequency band. In some embodiments, the active director is mounted forwardly of the cross-dipole radiator by no more than $1/4^{th}$ of the wavelength corresponding to the center frequency of the first frequency band.

In some embodiments, the first of the radiating elements is configured so that first electromagnetic radiation emitted forwardly by the cross-dipole radiator in response to an RF signal input at the RF port is within 30° of second electromagnetic radiation emitted by the active director in response to the RF signal when the first electromagnetic radiation reaches the active director.

In some embodiments, a shape of the second −45° polarization dipole radiator is substantially identical to a shape of the first −45° polarization dipole radiator, and a shape of the second +45° polarization dipole radiator is substantially identical to a shape of the first +45° polarization dipole radiator.

In other embodiments, a shape of the second −45° polarization dipole radiator is substantially different from a shape of the first −45° polarization dipole radiator, and a shape of the second +45° polarization dipole radiator is substantially different from a shape of the first +45° polarization dipole radiator.

In some embodiments, the cross-dipole radiator is formed on a first dipole radiator printed circuit board and the active director is formed on a second dipole radiator printed circuit board.

In some embodiments, a physical length of the second −45° polarization dipole radiator is different from a physical length of the first −45° polarization dipole radiator.

In some embodiments, the linear array of radiating elements comprises a first linear array of radiating elements, and the base station antenna further comprises a second linear array of radiating elements that are configured to operate in the first frequency band, wherein the radiating elements of the first and second linear arrays are arranged in first and second vertical columns, with all but a last of the radiating elements in the first vertical column and a last of the radiating elements in the second vertical column constituting the first linear array, and all but the last of the radiating elements in the second vertical column and the last of the radiating elements in the first vertical column constituting the second linear array.

In some embodiments, the linear array of radiating elements comprises a first linear array of radiating elements and the base station antenna further includes a third array of radiating elements that are configured to transmit and receive RF signals in a second operating frequency band that is higher than a first frequency band, and wherein the second −45° polarization dipole radiator and the second +45° polarization dipole radiator are both cloaked with respect to at least a portion of the second frequency band. In some embodiments, the first operating frequency band comprises the 617-960 MHz frequency band or a portion thereof, and the second operating frequency comprises the 1427-2690 MHz frequency band or a portion thereof.

In some embodiments, all of the radiating elements in the linear array of radiating elements are substantially identical Pursuant to further embodiments of the present invention, base station antennas are provided that include a reflector, a first array of lower-band radiating elements mounted to extend forwardly from the reflector, the lower-band radiating elements configured to transmit and receive RF signals in a first frequency band, and a second linear array of higher-band radiating elements mounted to extend forwardly from the reflector, the higher-band radiating elements configured to transmit and receive RF signals in a second frequency band that is at higher frequencies than the first frequency band. A first of the lower-band radiating elements includes first and second dipole radiators and a director mounted forwardly of the first and second dipole radiators, where both the first and second dipole radiators and the director are cloaked with respect to at least a portion of the second frequency band.

In some embodiments, the first of the lower-band radiating elements comprises a feed stalk, and the first and second dipole radiators comprise a −45° polarization dipole radiator and a +45° polarization dipole radiator that form a cross-dipole radiator that is mounted on the feed stalk.

In some embodiments, the base station antenna further comprises a lower-band feed network that couples a first RF port and a second RF port to each of the lower-band radiating elements in the first linear array, wherein the director is a passive director that is not coupled to the lower-band feed network.

In some embodiments, the base station antenna further comprises a lower-band feed network that couples a first RF port and a second RF port to each of the lower-band radiating elements in the first linear array, wherein the director is an active director that includes a −45° polarization dipole radiator and a +45° polarization dipole radiator that are each coupled to the lower-band feed network.

In some embodiments, the feed stalk extends through a central portion of the cross-dipole radiator, and the director is mounted on the feed stalk.

In some embodiments, the director is mounted forwardly of the cross-dipole radiator by at least $1/8^{th}$ of a wavelength corresponding to a center frequency of the first frequency band. In some embodiments, the director is mounted forwardly of the cross-dipole radiator by no more than $1/4^{th}$ of the wavelength corresponding to the center frequency of the first frequency band.

In some embodiments, a shape of the director is substantially the same as a shape of cross-dipole radiator.

In some embodiments, the director is configured to narrow azimuth beamwidths of antenna beams generated by the cross-dipole radiator.

In some embodiments, the cross-dipole radiator is formed on a first dipole radiator printed circuit board and the director is formed on a second dipole radiator printed circuit board.

In some embodiments, the base station antenna further comprises a second linear array of lower-band radiating elements mounted to extend forwardly from the reflector and configured to transmit and receive RF signals in the first frequency band, wherein the lower-band radiating elements of the first and second linear arrays of lower-band radiating elements are arranged in first and second vertically-extending columns, with all but a last of the lower-band radiating elements in the first vertical column and a last of the lower-band radiating elements in the second vertical column constituting the first linear array of lower-band radiating elements, and all but the last of the lower-band radiating elements in the second vertical column and the last of the lower-band radiating elements in the first vertical column constituting the second linear array of lower-band radiating elements.

In some embodiments, the first operating frequency band comprises the 617-960 MHz frequency band or a portion thereof, and the second operating frequency comprises the 1427-2690 MHz frequency band or a portion thereof.

Pursuant to still further embodiments of the present invention, base station antennas are provided that include a reflector, a first column of lower-band radiating elements mounted to extend forwardly from the reflector, the lower-band radiating elements configured to transmit and receive radio frequency ("RF") signals in a first frequency band, a second column of lower-band radiating elements mounted to extend forwardly from the reflector, and a third column of higher-band radiating elements mounted to extend forwardly from the reflector, the higher-band radiating elements configured to transmit and receive RF signals in a second frequency band that is at higher frequencies than the first frequency band. The lower-band radiating elements in the first column and at least a first additional lower-band radiating element form a first array of lower-band radiating elements. The lower-band radiating elements in the second column and at least a second additional lower-band radiating element form a second array of lower-band radiating elements. A first of the lower-band radiating elements includes first and second dipole radiators and a director mounted forwardly of the first and second dipole radiators, wherein both the first and second dipole radiators and the director are cloaked with respect to at least a portion of the second frequency band.

In some embodiments, the first additional lower-band radiating element is closer to a second vertical axis defined by the second column of lower-band radiating elements than it is a first vertical axis defined by the first column of lower-band radiating elements, and the second additional lower-band radiating element is closer to the first vertical axis than it is the second vertical axis.

In some embodiments, the first additional lower-band radiating element is positioned above or below the second column of lower-band radiating elements, and the second additional lower-band radiating element is positioned above or below the first column of lower-band radiating elements.

In some embodiments, the first additional lower-band radiating element is aligned along the second vertical axis, and the second additional lower-band radiating element is aligned along the first vertical axis.

DETAILED DESCRIPTION

Figure 1:
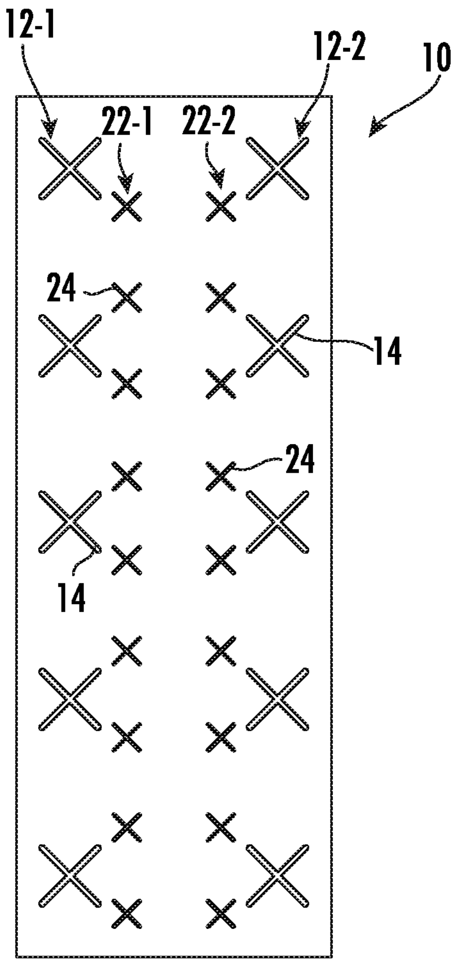
FIG. 1 (PRIOR ART)
FIG. 1 is a schematic front view of a conventional base station antenna (with the radome thereof removed) that includes two linear arrays of low-band radiating elements and two linear arrays of mid-band radiating elements.

Pursuant to embodiments of the present invention, base station antennas are provided that include one or more linear arrays of high-directivity low-band radiating elements. As discussed above, it can be difficult to provide base station antennas that include two linear arrays of low-band radiating elements that exhibit high directivity while meeting customer expectations regarding the width of the antenna. The base station antennas according to embodiments of the present invention address this problem by using passive or active directors to increase the directivity of each radiating element without requiring any increase in the width of the base station antenna.

Directors are routinely used in base station antennas, but typically are only used on higher band (e.g., mid-band and high-band) radiating elements because such radiating elements are "shorter" (i.e., they extend less far forwardly than the low-band radiating elements), and adding directors therefore does not increase the depth of the antenna. The directors are typically implemented as a piece of sheet metal that is mounted forwardly of the radiators of the radiating element. The director is typically smaller in size than the radiators, and is implemented as a square or nearly square piece of sheet metal. These conventional directors are electrically floating (i.e., they are not connected to ground or to an RF source).

The base station antennas according to embodiments of the present invention may include linear arrays of low-band radiating elements that include passive or active directors. The passive director may comprise a pair of crossed-dipoles in some embodiments. For example, the passive director may be substantially identical to the dipole radiators except that the dipole radiators are connected to the feed network of the antenna whereas the passive director may be electrically floating. The passive director may increase the directivity of the radiating element by nearly 0.5 dB in example embodiments.

An active director refers to a director that is coupled to the feed network of the antenna. In one implementation, this may be accomplished by providing a 1×2 power divider on either the feed stalk of the radiating element including the active director or on the feedboard on which the radiating element is mounted. The first output of the 1×2 power divider may be coupled to the dipole radiator of the radiating element, and the second output of the 1×2 power divider may be coupled to the active director. For dual-polarized radiating elements, two such 2×1 power dividers would be provided for each radiating element (one per polarization). The active directors according to embodiments of the present invention may be implemented, for example, as cross-dipole directors. In some embodiments, the active director may be substantially identical to the dipole radiators. The radiating element may be configured so that RF energy emitted by the dipole radiators will be in-phase, or nearly in-phase (e.g., within 30°), with RF energy emitted by the active director at the point where the RF energy emitted by the dipole radiators reaches the active director. The constructive combination of the RF energy emitted by the dipole radiator and the RF energy emitted by the active director acts to narrow the beamwidth of the antenna beam. The active director may increase the directivity of the radiating element by nearly 1.0 dB in example embodiments.

In some embodiments, the directors may be "cloaked" directors that are substantially invisible to RF energy in a frequency band in which other radiating elements in the antenna operate. Such cloaked directors may have little or no impact on the antenna beams generated by the other radiating elements in the antenna, even if the directors overlap the other radiating elements or are otherwise in close proximity to the directors. Both the active and passive directors according to embodiments of the present invention may have such a cloaked design.

In some embodiments, the low-band radiating elements may include a passive director that is mounted a relatively short distance forward (e.g., ⅛$^{th}$ of a wavelength corresponding to the center frequency of the low-band) forward of the radiators. This may help limit any necessary increase in the depth of the base station antenna to a manageable level (e.g., less than 0.5 cm).

In some embodiments, the radiating elements according to embodiments of the present invention may be used in Y-shaped or L-shaped arrays that can generate antenna beams having azimuth half-power beamwidths of 45° or even 33°. Typically, two-column antenna arrays are used to generate antenna beams having azimuth half-power beamwidths of 45°, and three-column antenna arrays are used to generate antenna beams having azimuth half-power beamwidths of 33°. The reduction in azimuth beamwidth provided by the directors may allow Y-shaped or L-shaped arrays to achieve azimuth half-power beamwidths of 45° or even 33°. This may allow doubling the number of RF ports in such antennas, significantly increasing thew capacity thereof.

Pursuant to some embodiments, base station antennas are provided that include an RF port, a reflector, a linear array of radiating elements that are mounted to extend forwardly from the reflector, and a feed network that electrically connects the RF port to each of the radiating elements in the linear array. The radiating elements are configured to operate in a first frequency band. A first of the radiating elements is a cross-dipole radiating element that includes a feed stalk, a cross-dipole radiator that includes a first −45° polarization dipole radiator and a first +45° polarization dipole radiator mounted on the feed stalk, and an active director that includes a second −45° polarization dipole radiator and a second +45° polarization dipole radiator mounted forwardly of the cross-dipole radiator. Both the cross-dipole radiator and the active director are coupled to the feed network. As noted above, a power divider on the feed stalk or feed board may be used to couple both the cross-dipole radiator and the active director to the feed network.

In other embodiments of the present invention, base station antennas are provided that include a reflector, a first array of lower-band radiating elements mounted to extend forwardly from the reflector, and a second linear array of higher-band radiating elements mounted to extend forwardly from the reflector. The lower-band radiating elements are configured to transmit and receive RF signals in a first frequency band, and the higher-band radiating elements configured to transmit and receive RF signals in a second frequency band. A first of the lower-band radiating elements includes a feed stalk, a −45° polarization dipole radiator and a +45° polarization dipole radiator that form a cross-dipole radiator that are mounted on the feed stalk, and a director mounted forwardly of the dipole radiators, where both the dipole radiators and the director are cloaked with respect to at least a portion of the second frequency band.

Embodiments of the present invention will now be discussed in more detail with reference to FIGS. 3A-8, which illustrate example base station antennas according to embodiments of the present invention as well as components that may be included in those base station antennas.

FIGS. 3A-3F illustrate a base station antenna 100 according to embodiments of the present invention. In the description that follows, the antenna 100 and the radiating elements included therein will be described using terms that assume that the antenna 100 is mounted for normal use with a longitudinal axis of the antenna 100 extending substantially (e.g., within 10%) along a vertical axis and the front surface of the antenna 100 pointing toward the coverage area for the antenna 100.

Figure 3A:
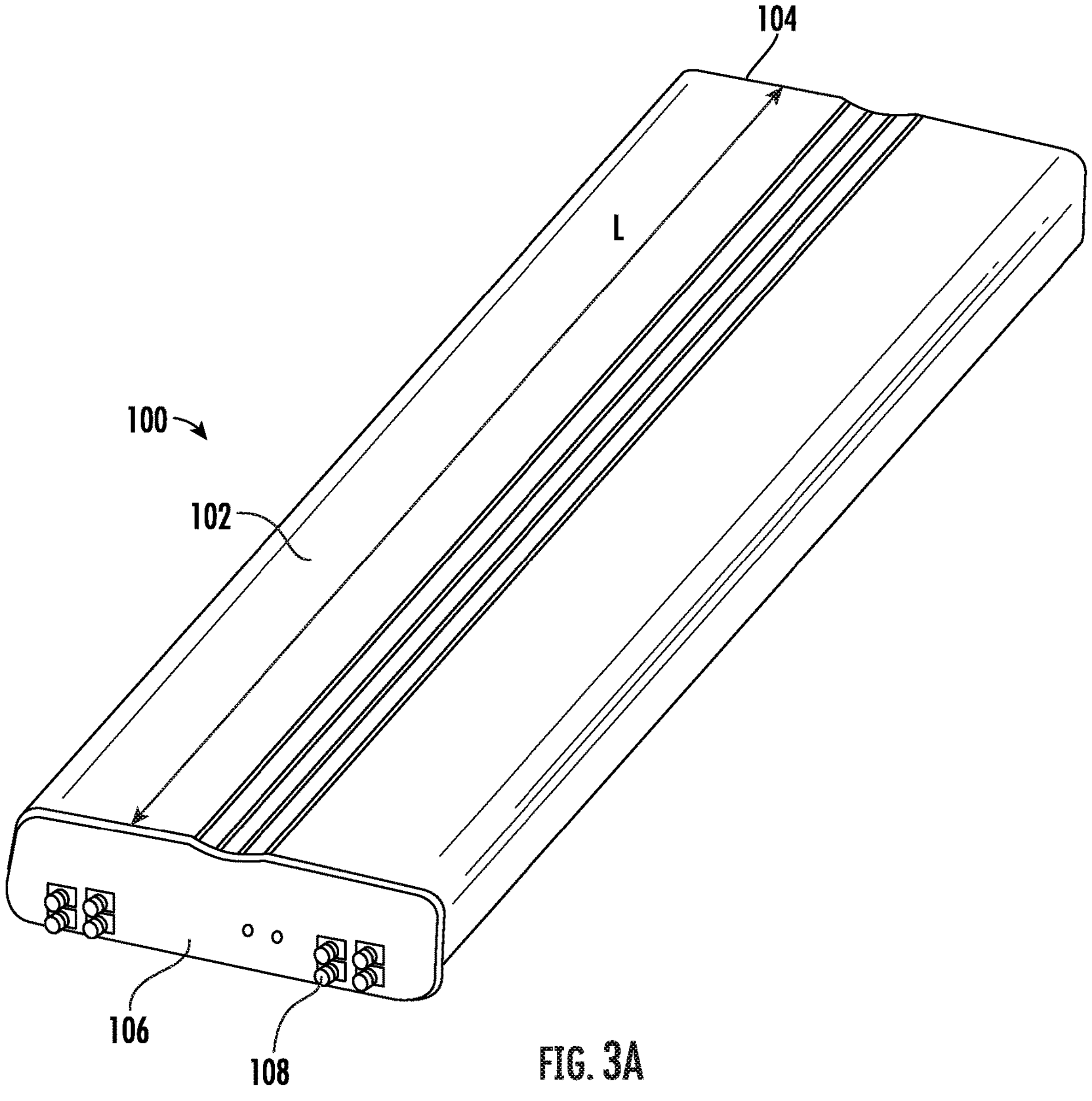
FIG. 3A is a perspective view of a base station antenna according to embodiments of the present invention.

FIG. 3A is a front perspective view of the base station antenna 100. As shown in FIG. 3A, the base station antenna 100 is an elongated structure that extends along a longitudinal axis L. The base station antenna 100 may have a tubular shape with a generally rectangular cross-section. The antenna 100 is typically mounted in a vertical configuration (i.e., the longitudinal axis L may be generally perpendicular to a plane defined by the horizon) when the antenna 100 is mounted for normal operation. The antenna 100 includes a radome 102 and a top end cap 104. The antenna 100 also includes a bottom end cap 106 which includes a plurality of RF ports (e.g., RF connectors) 108 mounted therein. The antenna 100 is typically mounted in a vertical configuration (i.e., the longitudinal axis L may be generally perpendicular to a plane defined by the horizon) when the antenna 100 is mounted for normal operation. The radome 102, top cap 104 and bottom cap 106 may form an external housing for the antenna 100. An antenna assembly 110 is contained within the external housing.

In some embodiments, the base station antenna 100 may be a sector base station antenna that includes arrays of radiating elements that are designed to provide coverage to a 120° sector in the azimuth plane. These arrays may generate antenna beams having an average half-power beamwidth in the azimuth plane of about 60-70° (the average is taken across the operating frequency band of the array).

Figure 3B:
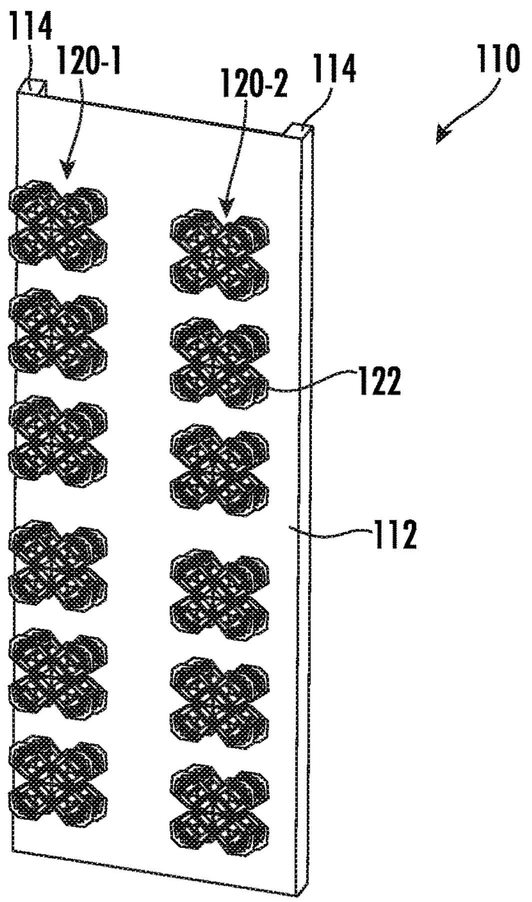
FIG. 3B is a schematic front perspective view of an antenna assembly of the base station antenna of FIG. 3A with the mid-band linear arrays omitted.

FIG. 3B is a schematic front perspective view of the antenna assembly 110. As shown in FIG. 3B, the antenna assembly 110 includes a reflector 112, which may comprise a flat metal surface. The reflector 112 may optionally include RF chokes 114 formed along either side thereof, which may improve the front-to-back ratio performance of the base station antenna 100. Various mechanical and electronic components of the antenna (not shown) may be mounted in a chamber that is defined between the RF chokes 114 such as, for example, phase shifters, remote electronic tilt units, mechanical linkages, controllers, diplexers, and the like. As is further shown in FIG. 3B, first and second linear arrays 120-1, 120-2 of low-band radiating elements 122 are mounted to extend forwardly from the reflector 112. The number of low-band radiating elements 122 included in each linear array 120 may be selected, for example, to meet specified elevation beamwidth requirements. The reflector 112 may act as a ground plane for the radiating elements 122 and may reflect forwardly RF radiation that is emitted backwardly by the radiating elements 122.

The low-band radiating elements 122 may comprise dual-polarized radiating elements. In the depicted embodiment, each low-band radiating element 122 is implemented as a cross-dipole radiating element 122 that includes a slant −45° polarization dipole radiator and a slant +45° polarization dipole radiator that are mounted in a cross or "X" arrangement. As such, each low-band linear array 120 may be used to form a pair of antenna beams, namely an antenna beam for each of the two slant polarizations. The low-band radiating elements 122 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.).

While not shown in FIG. 3B to simplify the drawing, the base station antenna may further include first and second linear arrays 126-1, 126-2 of mid-band radiating elements 128. These mid-band linear arrays 126-1, 126-2 may extend vertically in between the two low-band linear arrays 120-1, 120-2 (as shown, for example, in FIG. 1; see also FIG. 3E), with each mid-band radiating element 128 extending forwardly from the reflector 112. The mid-band radiating elements 128 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). It will be appreciated that the number of arrays of low-band radiating elements 122 and mid-band radiating elements 128 may be varied from what is described above, and that one or more multi-column arrays of radiating elements may also be included in base station antenna 100 (or may be included in place of the mid-band linear arrays 126).

The low-band radiating elements 122 may be mounted on feed boards 124 (see FIG. 3F) that couple RF signals to and from the individual radiating elements 122. One or more radiating elements 122 may be mounted on each feed board 124. FIG. 3F (discussed below) illustrates an example implementation in which two low-band radiating elements 122 are mounted on each feed board 124. The feed boards 124 are not shown in FIG. 3B to simplify the drawing. Cables may be used to connect each feed board 124 to other components of the antenna such as diplexers, phase shifters or the like.

Figure 3C:
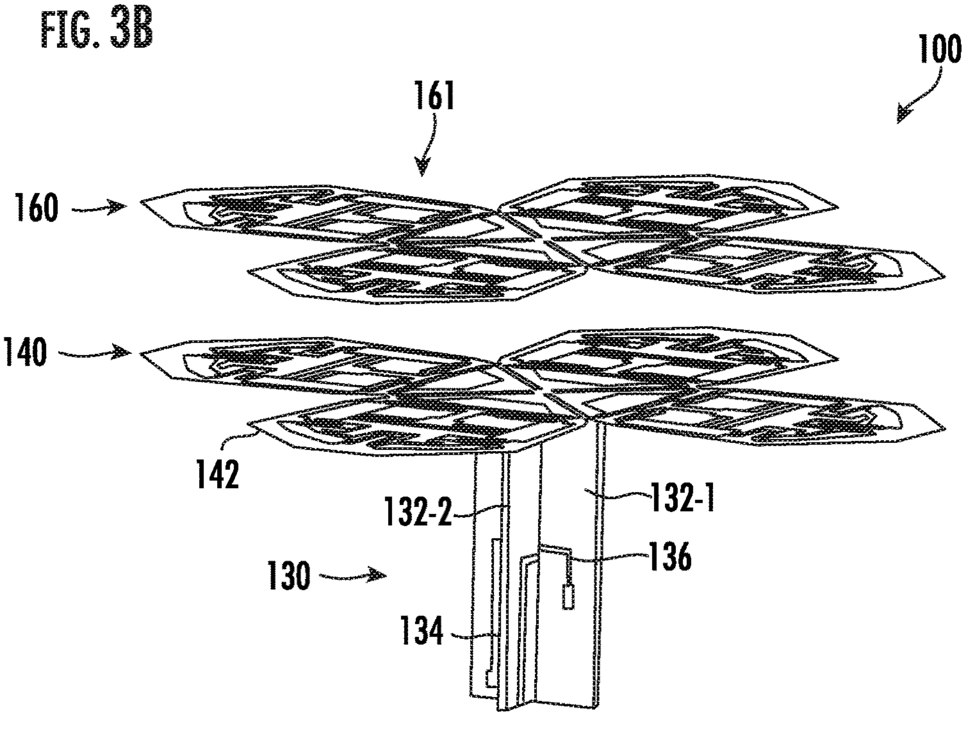
FIG. 3C is a schematic perspective view of one of the low-band radiating elements included in the antenna assembly of FIG. 3B.
Figure 3D:
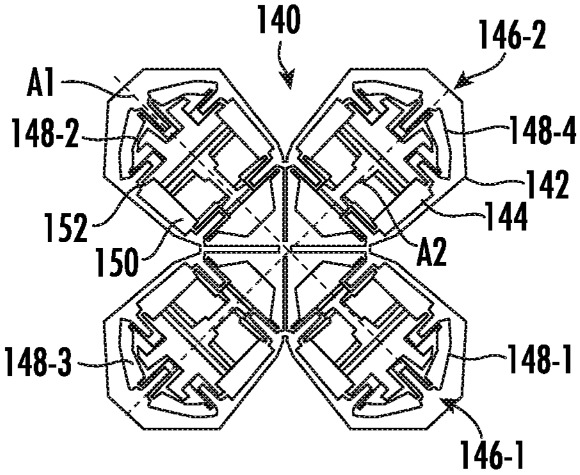
FIG. 3D is a front view of one of the dipole printed circuit boards included in the low-band radiating element of FIG. 3C.

FIG. 3C is a perspective view of one of the low-band radiating elements 122 shown in FIG. 3B. FIG. 3D is a front view of a dipole radiator printed circuit board included in the low-band radiating element 122. Referring to FIGS. 3C and 3D, each low-band radiating element 122 includes a feed stalk 130, a dipole radiator printed circuit board 140 and a passive director printed circuit board 160.

The feed stalk 130 may extend in a direction that is generally perpendicular to the reflector 112. The feed stalk 130 may be implemented as a pair of printed circuit boards 132-1, 132-2. Each printed circuit board 132 may have an RF transmission line 134 formed thereon. The RF transmission lines 134 carry RF signals between a feed board 124 (FIG. 3F) that is mounted on the reflector 112 and the dipole radiator printed circuit board 140. The RF transmission lines 134 may include a hook balun 136. A first of the printed circuit boards 132-1 may include a front slit and the second of the printed circuit boards 132-2 includes a back slit. These slits allow the two printed circuit boards 132 to be assembled together to form the feed stalk 130, which is a forwardly extending column that has generally x-shaped vertical cross-sections.

The dipole radiator printed circuit board 140 may be mounted on the feed stalk 130. The dipole radiator printed circuit board 140 may be mounted to extend in parallel to the reflector 112. As shown in FIG. 3D, the dipole radiator printed circuit board 140 includes a dielectric substrate 142 that has a conductive layer 144 formed on a front side thereof. The conductive layer 144 may comprise a patterned metal (e.g., copper) layer in example embodiments. The metal pattern forming conductive layer 144 forms a pair of dipole radiators 146-1, 146-2 (i.e., the metal patterns comprises a crossed-dipole radiator). Dipole radiator 146-1 includes first and second dipole arms 148-1, 148-2, and dipole radiator 146-2 includes third and fourth dipole arms 148-3, 148-4. The first and second dipole arms 148-1, 148-2 may extend along a first axis A1 and the third and fourth dipole arms 148-3, 148-4 may extend along a second axis A2 that is perpendicular to the first axis A1. Consequently, the first and second dipole radiators 146-1, 146-2 are arranged in the general shape of a cross. Dipole arms 148-1, 148-2 are center fed by the RF transmission line 134 on printed circuit board 132-1 and together radiate RF energy at a −45° polarization. Dipole arms 148-3, 148-4 are center fed by the second RF transmission line 134 on printed circuit board 132-2 and together radiate RF energy at a +45° polarization.

Figure 3E:
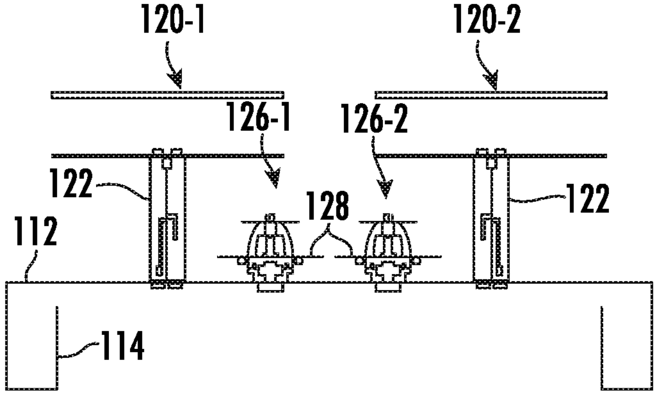
FIG. 3E is a schematic cross-sectional view of the antenna assembly of FIG. 3B with the mid-band radiating elements shown.
Figure 3F:
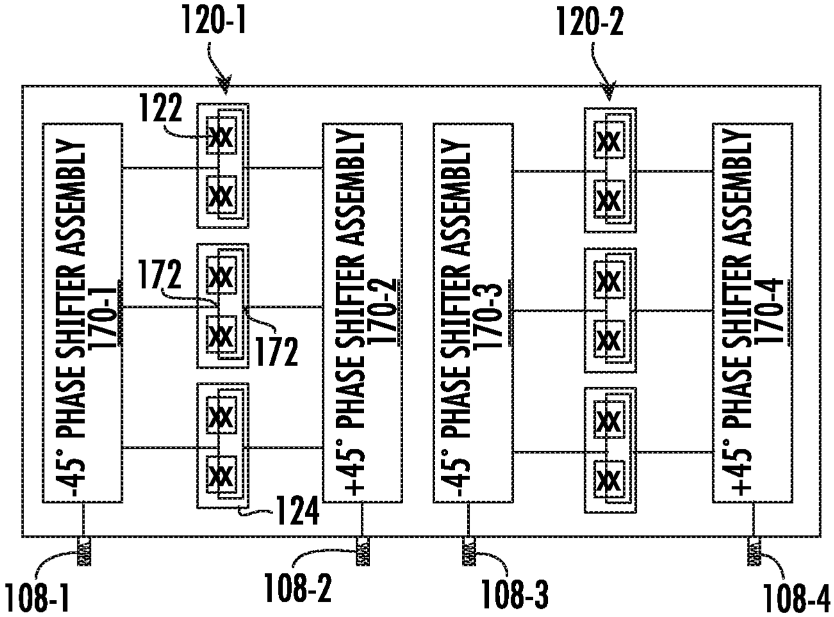
FIG. 3F is a schematic block diagram of a feed network for one of the arrays included in the base station antenna of FIG. 3A.

FIG. 3E is a schematic cross-sectional view of the antenna assembly of FIG. 3B. The mid-band radiating elements 128 that are omitted from FIG. 3B are shown in FIG. 3E. As can be seen, the low-band radiating elements 122 extend farther forwardly from the reflector 112 than do the mid-band radiating elements 128. In order to keep the width of the base station antenna 100 relatively narrow, the low-band radiating elements 122 may be located in very close proximity to the mid-band radiating elements 128. For example, at least some of the low-band radiating element 122 may overlap a substantial portion of one or more of the mid-band radiating elements 128. Herein, first and second radiating elements in an antenna "overlap" one another if an axis that is perpendicular to a plane defined by the reflector passes through both radiating elements.

A challenge in the design of multi-band base station antennas that have radiating elements that operate in different frequency bands that overlap is reducing the effect of scattering of the RF signals emitted by the higher-band radiating elements by the lower-band radiating elements. Scattering is undesirable as it may distort the shape of the antenna beams in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio in undesirable ways.

Dipole-based radiating elements typically have dipole radiators that have an electrical length that is approximately ½ a wavelength of the center frequency of the designed operating frequency band for the radiating element. The center frequency of the mid-band cellular frequency range (2059 MHz) is only slightly more than twice that the center frequency of the low-band cellular frequency range (828 MHz). Consequently, RF energy transmitted by the mid-band radiating elements will tend to couple to the dipole arms of the low-band radiating elements since such RF energy will be resonant in a dipole arm that has a length of about a ½ wavelength. The coupled RF energy generates mid-band currents on the low-band dipole arms, which in turn generate mid-band radiation that is emitted from the low-band dipole arms. The mid-band RF energy emitted from the low-band dipole arms distorts the antenna beam of the mid-band arrays since the radiation is being emitted from a different location than intended.

The low-band radiating elements 122 according to embodiments of the present invention may be designed to be substantially transparent to RF energy emitted by the mid-band radiating elements 128. Radiating elements having such a design are known in the art and are often referred to as "cloaking" radiating elements. The low-band radiating elements 122 included in base station antenna 100 have the "cloaking" design disclosed in U.S. Pat. No. 10,770,803. As can best be seen in FIG. 3D, each dipole arm 148 is formed as a series of widened conductive segments 150 that are coupled together by narrow inductive segments 152, which may be implemented as meandered traces on the dipole radiator printed circuit board. Herein, a meandered trace refers to a non-linear conductive path that follows a wandering path to increase the path length thereof. The trace may have a length that is much longer than its width. The inductive segments 152 may be designed to form a resonance within the operating frequency band of the mid-band radiating elements. Thus, the cloaking low-band radiating elements according to embodiments of the present invention may include dipole arms having resonant circuits (e.g., L, LC, LCR, etc.) that have resonant frequencies within the operating frequency band of the mid-band radiating elements.

As shown in FIG. 3D, each dipole arm 148 may include a total of five widened conductive segments 150 and five narrow inductive segments 152 that physically and electrically connect the widened conductive segments 150. Each dipole arm 148 is formed as a conductive loop, which allows the physical length of the dipole arm 148 to be reduced in size (as compared to a straight dipole arm) while still achieving a desired electrical length. Since the meandered traces 152 have a small physical footprint, adjacent widened conductive segments 150 may be in close proximity to each other so that the five widened conductive segments 150 together appear as a single dipole arm at frequencies within the operating frequency range of the low-band radiating element 122. The narrowed meandered traces 152 act as high impedance sections that interrupt currents associated with a nearby mid-band radiating element that otherwise would be induced on the dipole arms 148, but do so without significantly impacting the ability of the low-band currents to flow on the dipole arms 148. As such, the narrowed meandered traces 152 may reduce induced mid-band currents on the low-band radiating element 200 and consequent disturbance to the antenna pattern of nearby mid-band radiating elements (not shown).

Referring again to FIG. 3C, the passive director printed circuit board 160 is mounted forwardly of the dipole radiator printed circuit board 140. In some embodiments, the passive director printed circuit board 160 may be substantially identical to the dipole radiator printed circuit board 140, except that the dipole arms 148 form a passive director 161 as opposed to cross-dipole radiators. In such embodiments, the only difference between the dipole radiator printed circuit board 140 and the passive director printed circuit board 160 is that the dipole arms 148 included on the passive director printed circuit board 160 are not connected to any RF source or to electrical ground (i.e., the dipole arms 148 on the passive director printed circuit board 160 are electrically floating). Thus, it will be appreciated that FIG. 3D not only depicts the dipole radiator printed circuit board 140, but also depicts an embodiment of the passive director printed circuit board 160. The metal pattern on the passive director printed circuit board 160 forms a passive director 161. Since the design of the printed circuit board shown in FIG. 3D has been described above, further description of that design when it is used as a passive director printed circuit board 160 will be omitted.

Figure 5A:
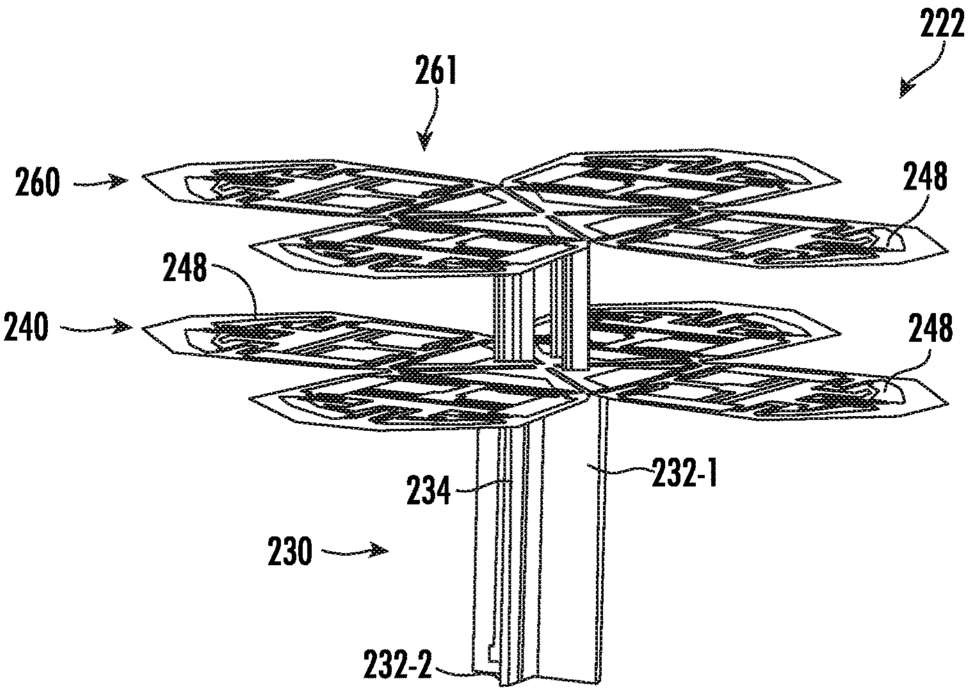
FIG. 5A is a schematic perspective view of a low-band radiating element having an active director that can be used in base station antennas according to further embodiments of the present invention.

The mechanism for mounting the passive director printed circuit board 160 forwardly of the dipole radiator printed circuit board 140 is not shown in FIG. 3C, as a variety of approaches may be used. For example, in some cases, the feed stalk 130 may be extended forwardly, and the passive director printed circuit board 160 may then be mounted on the feed stalk (e.g., in the same fashion that the dipole radiator printed circuit board 140 is mounted on the feed stalk 130). FIG. 5A depicts another low-band radiating element according to embodiments of the present invention that uses this approach. In other embodiments, a separate dielectric support may be mounted on the dipole radiator printed circuit board 140 that is used to support the passive director printed circuit board 160 in position. Numerous other approaches may be used.

The passive director 161 that is implemented in passive director printed circuit board 160 may act to increase the directivity of the RF radiation emitted by the dipole radiators 146-1, 146-2 if the RF energy emitted by dipole radiators 146-1, 146-2 is substantially in-phase with the RF energy emitted by the passive director 161 when the RF energy emitted by the dipole radiators 146-1, 146-2 reaches the passive director 161. The phase difference $\psi$ between the current I1 that flows on one of the dipole radiators 146-1 and the current I2 that flows on the corresponding dipole radiator 146-1 of the passive director 161 may be determined as follows:

$$\psi = \pi + \arctan(x_{21}/R_{21}) - \arctan(x_{11}/R_{11})$$

where $x_{21}$ is the imaginary component of the mutual impedance between the two dipole radiators 146-1 (i.e., the dipole radiators 146-1 on the dipole radiator printed circuit board 140 and on the passive director printed circuit board 160), $R_{21}$ is the real component of the mutual impedance between the two dipole radiators 146-1, $x_{11}$ is the imaginary component of the self-impedance of the dipole radiator 146-1 of the passive director 161, and $R_{11}$ is the real component of the self-impedance of the dipole radiator 146-1 of the passive director 161.

Based on the above formula, it is possible to adjust the phase difference between I1 and I2 by changing the self-impedance and the mutual impedance values. The phase difference may be adjusted to increase the directivity of the radiating element 122. The mutual impedance may be changed, for example, by changing the distance between the dipole radiator printed circuit board 140 and the passive director printed circuit board 160. The self-impedance of the passive director 161 may be changed, for example, by changing the dimensions or size of the passive director 161, or the shape or size of the traces forming the passive director 161. As such, the radiating element 122 may be designed so that the RF energy emitted by the driven dipole radiator 146 and the corresponding dipole radiator 146 of the passive director 161 are in-phase (or at least relatively close to being in-phase) when the RF energy combines. When this happens, the passive director 161 acts to focus the RF energy, thereby narrowing both the azimuth beamwidth and the elevation beamwidth of the element pattern of radiating element 122.

Thus, it will be understood that each low-band radiating element according to embodiments of the present invention may have an active cross-dipole radiator that will generate antenna beams having a first HPBW in the azimuth plane if these radiating elements are operated without any director attached. When the director is attached to the radiating elements, the radiating elements will generate antenna beams having a second HPBW in the azimuth plane, where the second HPBW is less than the first HPBW.

It will be appreciated that in some embodiments it may be necessary to space the passive director printed circuit board 160 a minimum distance from the dipole radiator printed circuit board 140 in order to achieve the desired in-phase radiation characteristic. For example, in some embodiments, it may be necessary to space the passive director printed circuit board 160 at least a quarter wavelength (where the wavelength corresponds to the center frequency of the operating frequency band of the radiating element 122) to achieve in-phase radiation (meaning that the RF energy emitted by the cross-dipole radiator and the passive director are in-phase at the point that they combine along the boresight pointing direction of the radiating element 122) and hence to achieve the maximum possible increase in directivity. However, directivity gains can still be achieved even if such in-phase operation is not achieved. Thus, in some embodiments, the low-band radiating elements may be configured so that first electromagnetic radiation emitted forwardly by the cross-dipole radiator 146 in response to an RF signal input at the RF port is within 30°, within 20°, within 10° or within 5° of second electromagnetic radiation emitted by the passive director 161 in response to the RF signal when the first electromagnetic radiation reaches the passive director 161.

The passive director 161 may also overlie the mid-band radiating elements 128 as shown in FIG. 3E. By forming the dipole arms 146 of the passive director 161 as cloaked dipole arms it is possible to reduce or eliminate any scattering of RF energy emitted by the mid-band radiating elements 128 by the passive directors 161.

FIG. 3F is a block diagram of the feed networks for the two low-band linear arrays 120-1, 120-2 included in the base station antenna 100 of FIG. 3A. As shown in FIG. 3F, a total of four RF ports 108 are provided that are used to feed the low-band linear arrays 120-1, 120-2. In FIG. 3F, each radiating element 122 in the low-band arrays 120 is designated by a pair of X's, with the first X representing the cross-dipole radiator and the second X representing the passive director 161.

Two RF ports 108 are coupled to each low-band linear array 120, one for each polarization. As shown, each RF port 108 is coupled to a respective 1×3 phase shifter assembly 170 by, for example, a coaxial cable (not shown). Each phase shifter assembly 170 includes a power splitter/combiner and a phase shifter (not shown separately). The power splitter/combiner divides each RF transmit signal into a plurality of sub-components and combines a plurality of sub-components of each received RF signal into a single combined received RF signal. The phase shifter imparts a phase progression to the sub-components of the transmit and receive RF signals. The phase shifter may be an adjustable phase shifter that can be remotely controlled to vary the amount of phase progression applied to the transmit and receive RF signals in order to impart a desired amount of electrical downtilt to the antenna beam. Suitable phase shifter assemblies are disclosed, for example, in U.S. Patent Publication No. 2017/0365923, the entire content of which is incorporated herein by reference.

The three outputs of each phase shifter assembly 170 are coupled to respective feedboards 124 by, for example, coaxial cables. Since two phase shifter assemblies 170 feed each low-band linear array 120 (a phase shifter assembly for each polarization), each feedboard 124 is coupled to two of the phase shifter assemblies 170. The output of each phase shifter assembly 170 is input to a respective power divider 172 on the feedboard 124, which splits the sub-components of an RF signal fed thereto and passes those sub-components to the first or second polarization dipole radiators 146-1, 146-2 of the two radiating elements 122 mounted on the feedboard 124.

Figure 4A:
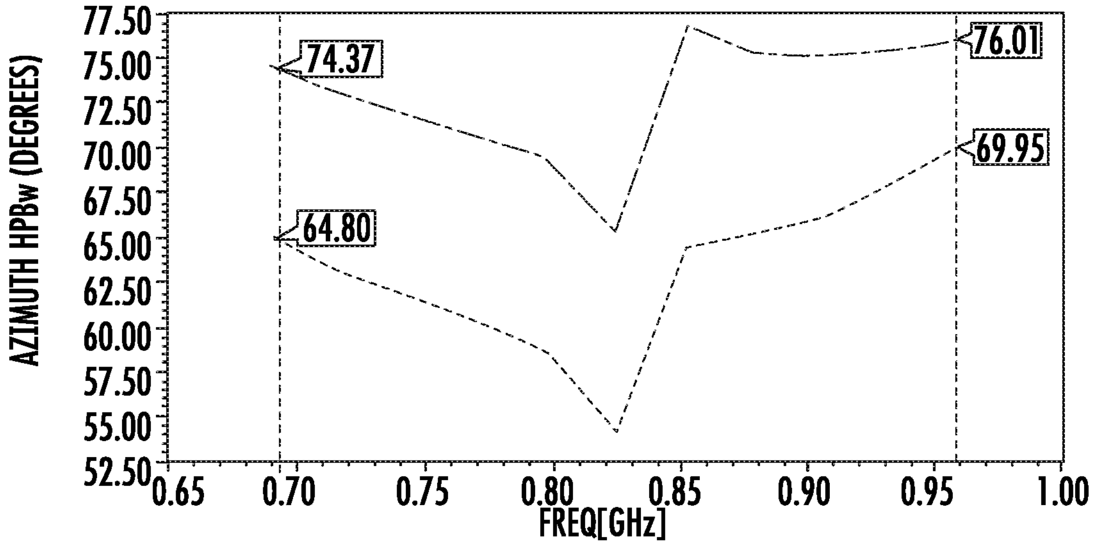
FIG. 4A is a graph of the simulated azimuth HPBW as a function of frequency for the antenna beams generated by one of the low-band linear arrays of the antenna of FIG. 3A for the cases where the linear arrays do and do not include passive directors on the radiating elements.
Figure 4B:
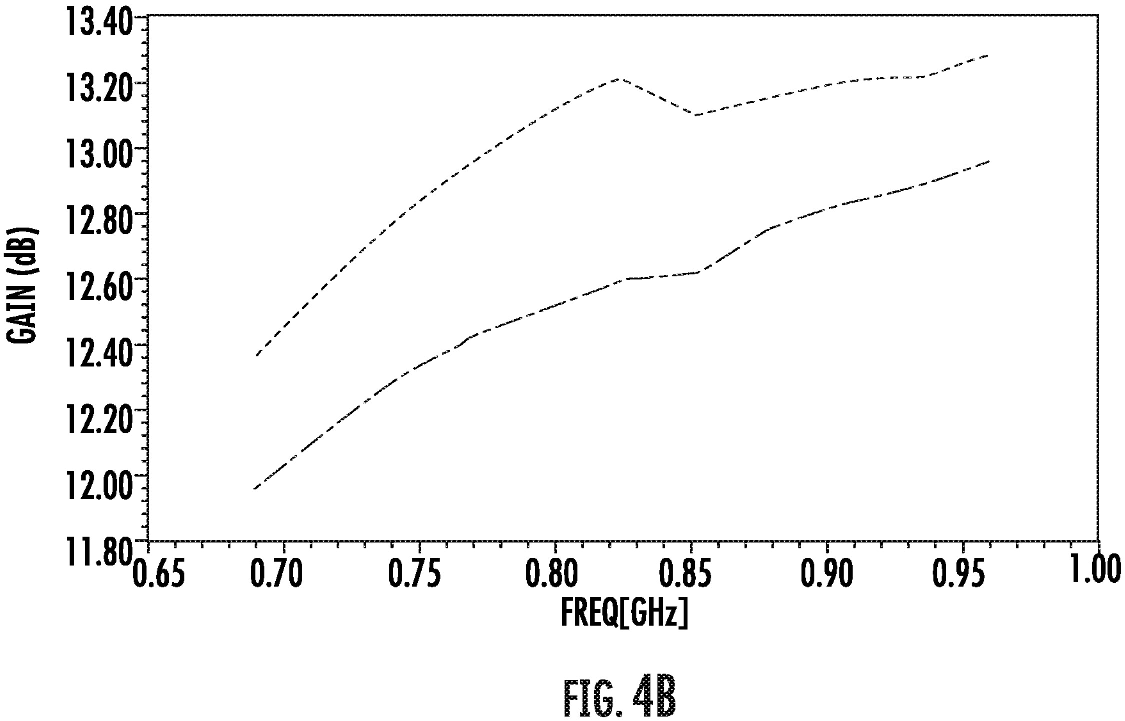
FIG. 4B is a graph of the simulated peak directivity as a function of frequency for the antenna beams generated by one of the low-band linear arrays of the antenna of FIG. 3A for the cases where the linear arrays do and do not include passive directors on the radiating elements.

FIGS. 4A and 4B illustrate how the inclusion of the passive director 161 impacts the azimuth HPBW and peak directivity of the antenna beams generated by the low-band linear arrays 120. In particular, FIG. 4A is a graph of the simulated azimuth HPBW as a function of frequency for the antenna beams generated by the one of the low-band linear arrays 120. The upper curve in FIG. 4A shows the azimuth HPBW for a modified version of the linear array 120 in which the passive directors 161 were omitted. As shown, such a linear array exhibits azimuth HPBWs that vary between about 65° and 76° across the 696-960 MHz low-band frequency range, with an average azimuth HPBW of about 73°. The lower curve in FIG. 4A shows that the linear arrays 120 of base station antenna 100 (where each low-band radiating element 122 includes the passive director 161) generate antenna beams that exhibit azimuth HPBWs that vary between about 54° and 70° across the 696-960 MHz low-band frequency range, with an average azimuth HPBW of about 63°. Thus, FIG. 4A illustrates how the addition of the cloaking passive directors 161 may significantly narrow the azimuth HPBW.

While FIG. 4A focuses on the change in the azimuth HPBW provided by the inclusion of the passive director, it will be appreciated that the passive director will narrow the HPBW in both the azimuth and elevation planes. Typically, the desired elevation HPBW is achieved in a base station antenna by selecting the number of radiating elements included in the linear arrays thereof. Thus, narrowing the elevation beamwidth is typically not a major issue. However, since the radiating elements according to embodiments of the present invention exhibit narrower elevation beamwidths, it may be possible in some cases to include fewer (e.g., one fewer) radiating elements in the linear arrays. This may advantageously shorten the length of the antenna and/or reduce the cost of the antenna.

FIG. 4B is a graph of the simulated peak directivity as a function of frequency for the antenna beams generated by the same two linear arrays used to generate the graph of FIG. 4A. The lower curve in FIG. 4B shows the peak directivity of the antenna beams generated by the linear array of low-band radiating elements that do not include passive directors 161. As shown, this linear array generates antenna beams that have peak directivity levels that range from 11.96 to 12.96 dB across the 696-960 MHz low-band frequency range, with an average value of 12.55 dB. The upper curve in FIG. 4B shows that the linear array of low-band radiating elements that includes passive directors 161 generates antenna beams that have peak directivity levels that vary between 12.36 and 13.28 dB across the 696-960 MHz low-band frequency range, with an average value of 13.02 dB. Thus, FIG. 4B illustrates that provision of the passive directors 161 may increase peak directivity by nearly 0.5 dB.

Figure 5B:
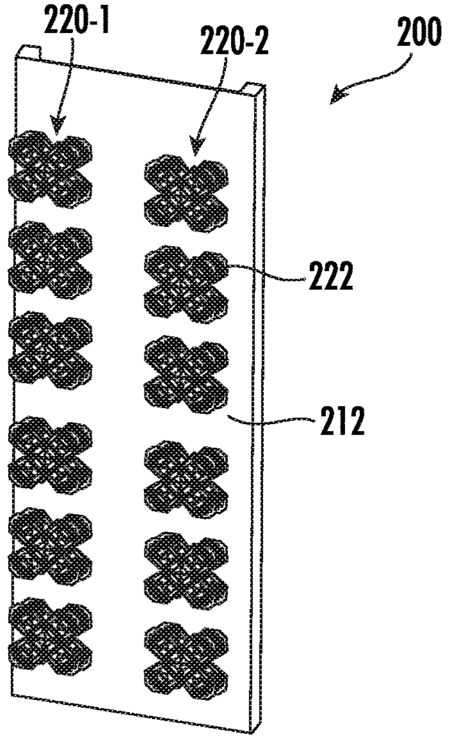
FIG. 5B is a schematic block diagram of a base station antenna that includes two linear arrays of the low-band radiating element of FIG. 5A.
Figure 5C:
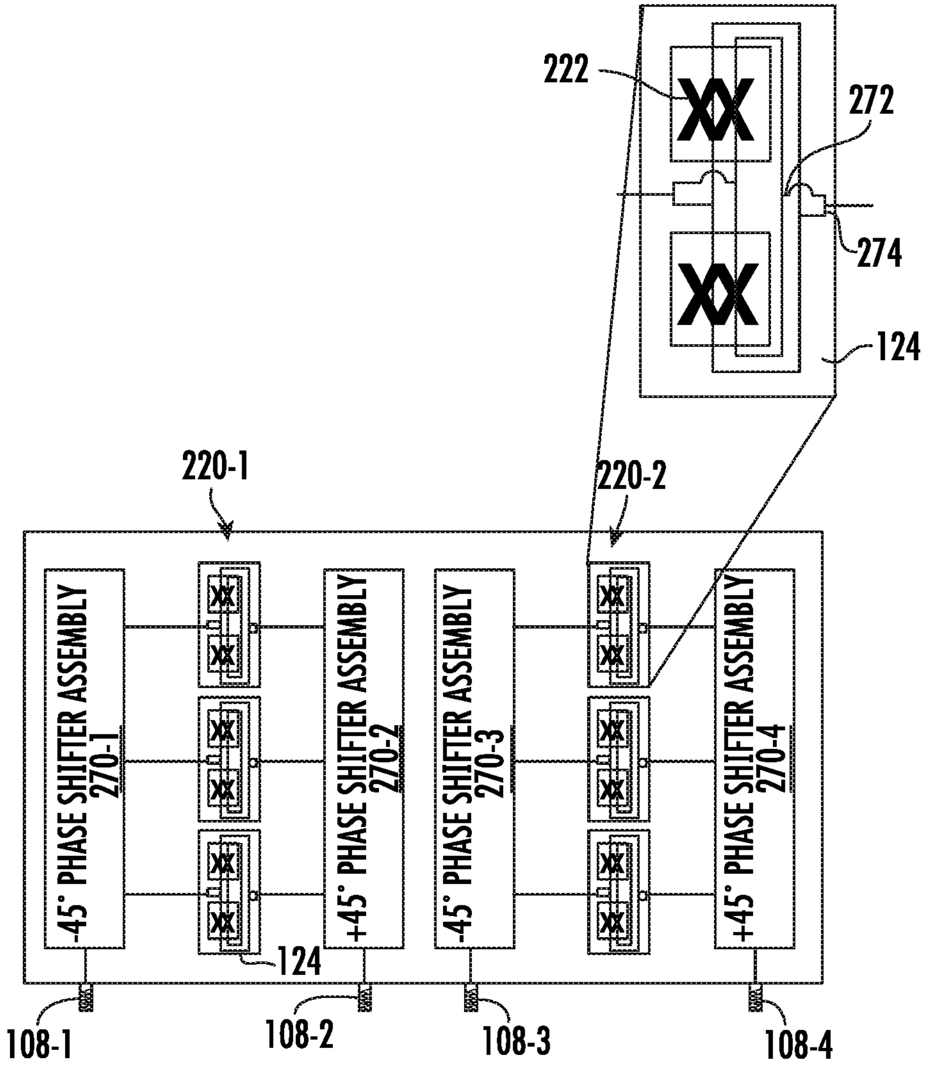
FIG. 5C is a schematic block diagram of a feed network for the low-band linear arrays included in the base station antenna of FIG. 5B.

FIGS. 3A-3F illustrate a base station antenna having low-band linear arrays 120 that include passive directors 161. As discussed above, pursuant to further embodiments of the present invention, base station antennas are provided that have low-band linear arrays that include active directors that are actively fed RF signals. FIGS. 5A-5C illustrate a base station antenna 200 according to embodiments of the present invention that includes arrays of low-band radiating elements that include such active directors. As the base station antenna 200 may be very similar to the base station antenna 100 discussed above, the following description will focus on the differences between the two antennas.

Referring first to FIG. 5A, a schematic perspective view of one of the low-band radiating elements 222 of base station antenna 200 is shown. The low-band radiating element 222 includes a feed stalk 230, a dipole radiator printed circuit board 240 and an active director printed circuit board 260. As can be seen, the radiating element 222 may be very similar to radiating element 122 of FIG. 3C, except that the printed circuit boards 232 of the feed stalk 230 of radiating element 222 include RF transmission lines that feed the dipole arms 148 of the active director 261 and also feed the dipole arms 148 of the dipole radiator printed circuit board 240.

The feed stalk 230 includes a pair of printed circuit boards 232-1, 232-2 that have RF transmission lines 234 formed thereon. The RF transmission lines 234 carry RF signals between a feed board 124 (FIG. 3F) that is mounted on the reflector 112 and both the dipole radiator printed circuit board 240 and the active director printed circuit board 260. The RF transmission lines 234 may include appropriate structures (not shown) such as, for example, power splitters for dividing an RF signal input to the feed stalk 230 into multiple sub-components that are fed to both the dipole radiator printed circuit board 240 and the active director printed circuit board 260.

The dipole radiator printed circuit board 240 is mounted on the feed stalk 230, and may be similar or identical to the dipole radiator printed circuit board 140 of radiating element 122. Accordingly, further description thereof will be omitted. The active director printed circuit board 260 may likewise be similar to the passive director printed circuit board 140 of radiating element 122, with the one difference being that the dipole arms 248 of the active director printed circuit board 260 are either galvanically or reactively coupled to the RF transmission lines 234 on the feed stalk 230 so that the dipole arms 248 are directly driven by the RF signals coupled to input low-band radiating element 222. Otherwise, the active director printed circuit board 260 may be identical to the passive director printed circuit board 140 of radiating element 122.

While FIG. 5A illustrates one example technique for feeding RF signals to both the dipole radiator printed circuit board 240 and to the active director printed circuit board 260, it will be appreciated that a wide variety of different techniques may be used. For example, dipole radiator printed circuit boards are routinely fed using hook baluns on a feed stalk, where the hook balun transfers the RF energy to an edge coupled stripline. This feeding approach could be extended by having the feed stalk extend through the dipole radiator printed circuit board 240 to the active director printed circuit board 260 and feed the active director 261 in the same manner.

FIG. 5B is a schematic block diagram of base station antenna 200. As shown, base station antenna 200 includes two linear arrays 220-1, 220-2 of the low-band radiating elements 222 of FIG. 5A. While not shown in FIG. 5B to simplify the drawing, base station antenna 200 further includes a pair of linear arrays of mid-band radiating elements. These mid-band linear arrays may be positioned relative to the low-band linear arrays 220 in the same manner that the low-band and mid-band linear arrays are positioned in the antennas of FIGS. 1 and 3E that are discussed above.

FIG. 5C is a schematic block diagram of a feed network for the linear arrays 220 of low-band radiating elements 222 included in the base station antenna 200 of FIG. 5B. As shown in FIG. 5C, the feed network for linear arrays 220-2, 220-2 is very similar to the feed network for the linear arrays 120-1, 120-2 of base station antenna 100. The one difference is that the outputs of the phase shifters 270 are coupled to additional power dividers 274 that further split each sub-component of an RF signal output by the phase shifter assemblies so that each dipole arm on both the dipole radiator printed circuit board 240 and the active director printed circuit board 260 is fed a sub-component of each RF signal input to a respective one of the low-band linear arrays 220. In FIG. 5C the power splitters 274 that split the RF energy between the dipole radiator printed circuit boards 240 and the active director printed circuit boards 260 are located on the feedboards 124. It will be appreciated, however, that more commonly this power division will be performed on the feed stalks 230.

Figure 6A:
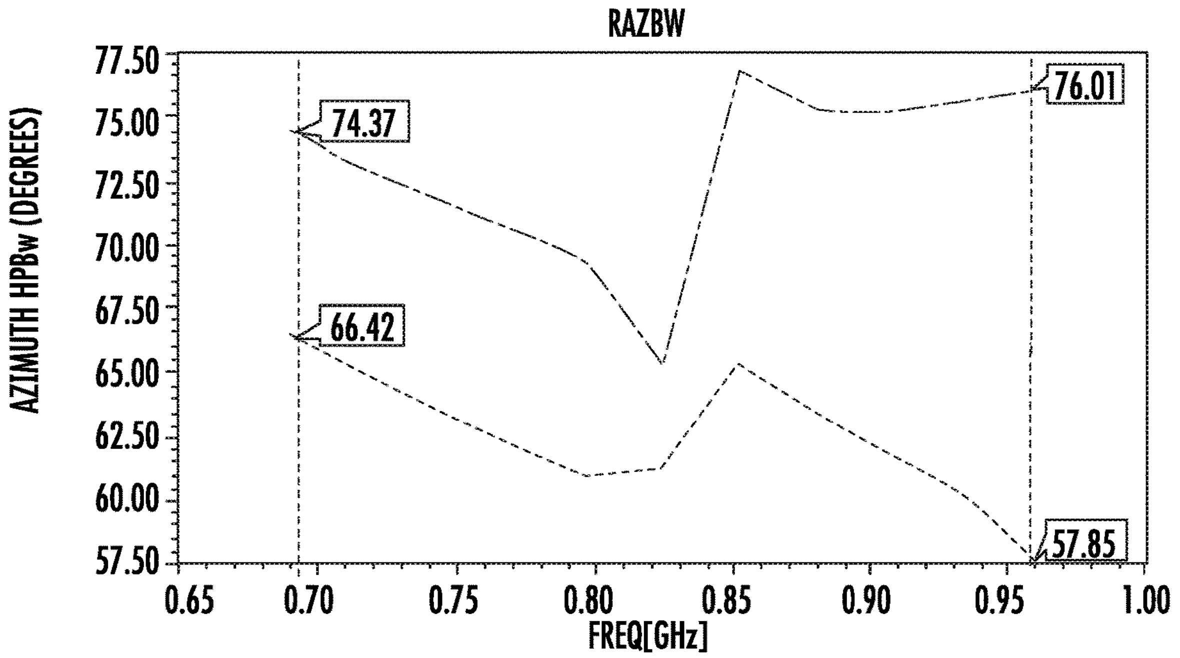
FIG. 6A is a graph of the simulated azimuth half-power beamwidth as a function of frequency for the antenna beams generated by one of the low-band linear arrays of the antenna of FIG. 5B for the cases where the linear arrays do and do not include active directors on the radiating elements.
Figure 6B:
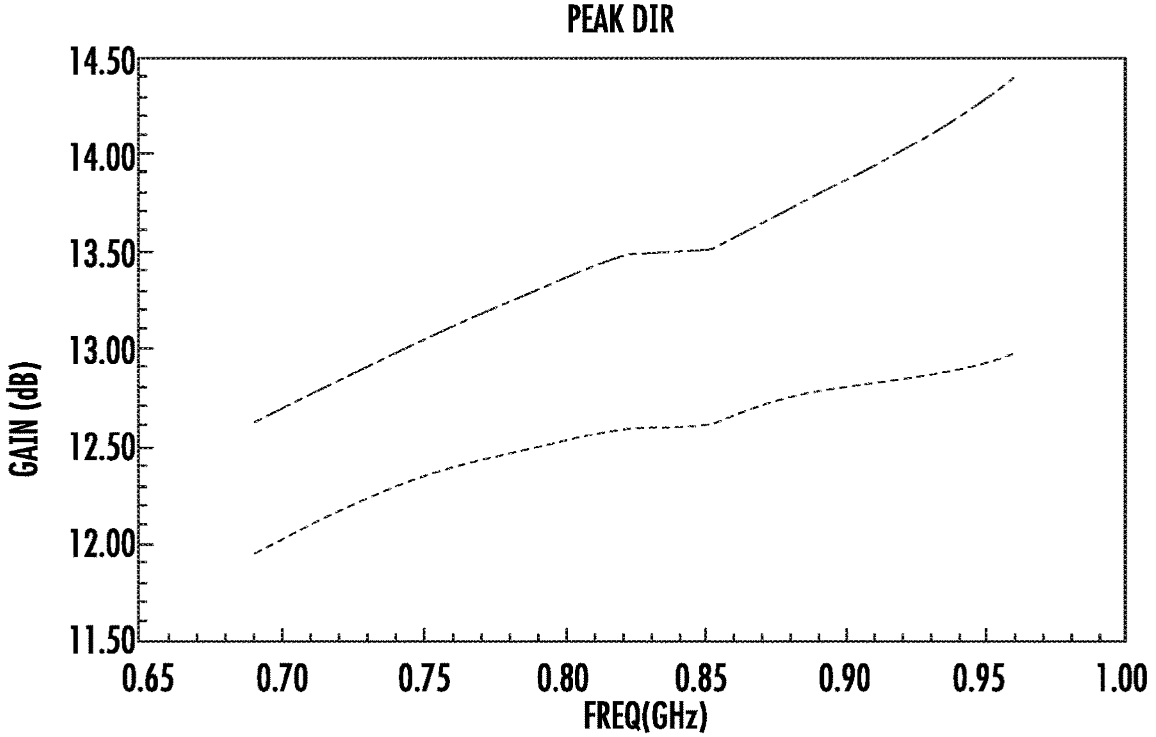
FIG. 6B is a graph of the simulated peak directivity as a function of frequency for the antenna beams generated by one of the low-band linear arrays of the antenna of FIG. 5B for the cases where the linear arrays do and do not include active directors on the radiating elements.

FIGS. 6A and 6B illustrate how the inclusion of the active director 261 impacts the azimuth HPBW and peak directivity of the antenna beams generated by the low-band linear arrays 220. In particular, FIG. 6A is a graph of the simulated azimuth HPBW as a function of frequency for the antenna beams generated by the low-band linear arrays 220. The upper curve in FIG. 6A shows the azimuth HPBW of the antenna beams generated by a modified version of the linear array 220 in which the active directors 261 were omitted. As shown, such a linear array exhibits azimuth HPBWs that vary between about 65° and 76° across the 696-960 MHz low-band frequency range, with an average azimuth HPBW of about 73°. The lower curve in FIG. 6A shows that the linear arrays 220 of base station antenna 100 (where each low-band radiating element 222 includes an active director 261) generate antenna beams having azimuth HPBWs that vary between about 58° and 66° across the 696-960 MHz low-band frequency range, with an average azimuth HPBW of about 63°. Thus, FIG. 6A illustrates how the addition of the cloaking active directors 261 may significantly narrow the azimuth HPBW. Moreover, the variation in azimuth HPBW shown in FIG. 6A is less than the variation shown in FIG. 4A, indicating that the active directors 261 may provide a more stable azimuth HPBW across the operating frequency band, which is desirable.

FIG. 6B is a graph of the simulated peak directivity as a function of frequency for the antenna beams generated by the same two linear arrays used to generate the graph of FIG. 6A. The lower curve in FIG. 6B shows the peak directivity for the linear array of low-band radiating elements that does not include any active directors. As shown, this linear array exhibits peak directivity levels that range from 11.96 to 12.96 dB across the 696-960 MHz low-band frequency range, with an average value of 12.55 dB. The upper curve in FIG. 6B shows that the linear array 220 of low-band radiating elements 222 that includes active directors 261 exhibits peak directivity levels that vary between 12.6 and 13.4 dB across the 696-960 MHz low-band frequency range, with an average value of 13.5 dB. Thus, FIG. 6B illustrates that provision of the active directors 261 may increase peak directivity by nearly 1.0 dB.

Figure 7A:
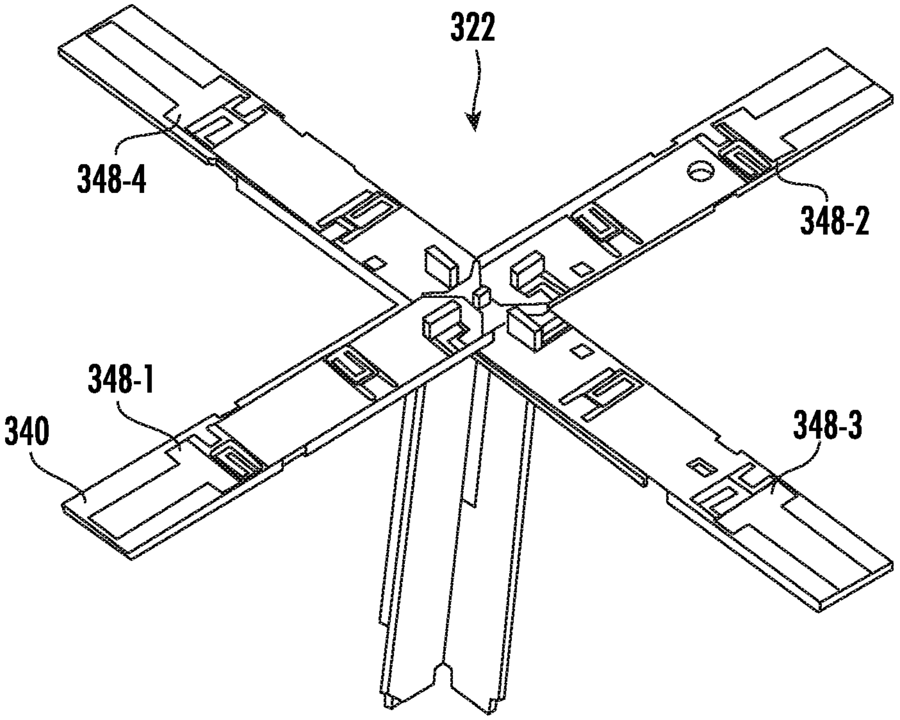
FIG. 7A is schematic perspective view of a low-band radiating element (with a director thereof omitted) that can be used in base station antennas according to further embodiments of the present invention.

It will be appreciated that the low-band radiating elements according to embodiments of the present invention are not limited to having dipole arms with the shape of the dipole arms 146, 246 discussed above. Instead, the dipole arms may have any appropriate shape such as line shapes, circular shapes, oval shapes, square shapes, etc. For example, FIG. 7A is schematic perspective view of a low-band radiating element 322 (with a director thereof omitted) that can be used in base station antennas according to further embodiments of the present invention. As shown in FIG. 7A, the low-band radiating element 322 includes four dipole arms 346 that are line shaped dipole arms. Radiating element 322 is discussed in detail in U.S. patent application Ser. No. 17/440,089 filed Sep. 16, 2021, so further description thereof will be omitted here.

Figure 7B:
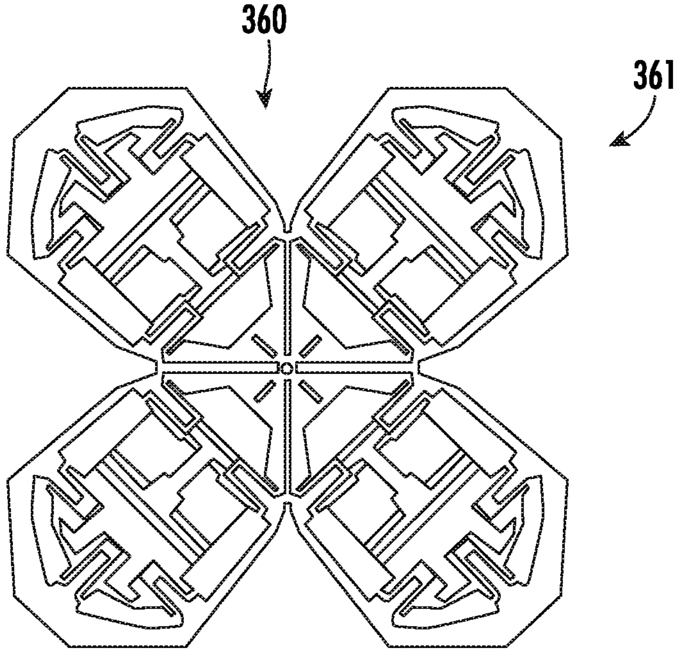
FIG. 7B is a schematic front view of a director which can be used as an active or passive director with the low-band radiating element of FIG. 7A.

While not shown in FIG. 7A, either an active director or a passive director may be mounted forwardly of the dipole arms 346 on dipole radiator printed circuit board 340. FIG. 7B is a schematic front view of a director printed circuit board 360 that includes a director 361 that may be used as either an active director or a passive director for radiating element 322. As is readily apparent, the dipole radiators 346 of radiating element 322 and the director 361 have very different designs. Both are implemented using cloaked dipole arms. Thus, it will be appreciated that the shape of each dipole radiator of the active cross-dipole radiator may be the same as, or may be different than the shape of each dipole radiator of the active cross-dipole radiator of the director. It will also be appreciated that, as shown in FIGS. 7A-7B, the physical lengths of the dipole radiators of the active cross-dipole radiator may be different than the physical lengths of the dipole radiators of the director. While not shown in the figures, in other embodiments, the dipole radiator printed circuit board 340 may be used to implement the director 361 and the director printed circuit board 360 may be used to implement the dipole radiators. This can be accomplished by reversing the positions of the two printed circuit boards 340, 360.

Figure 8A:
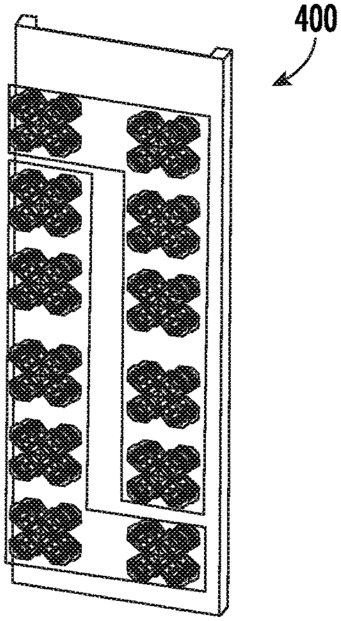
FIGS. 8A-8E are schematic block diagrams of base station antennas according to embodiments of the present invention that include L-shaped or Y-shaped arrays of high directivity low-band radiating elements.

FIG. 8A is a schematic perspective view of the antenna assembly of a base station antenna according to embodiments of the present invention that includes an L-shaped array of high directivity low-band radiating elements. Certain cellular operators limit the widths of base station antennas for various applications. Common width limits are 430 mm and 498 mm. Certain applications require low-band linear arrays that generate antenna beams having azimuth HPBWs of 45° or 33°. As discussed above, typically, two-column antenna arrays are used to generate antenna beams having azimuth half-power beamwidths of 45°, and three-column antenna arrays are used to generate antenna beams having azimuth half-power beamwidths of 33°. It can be difficult to implement two such antenna arrays in a base station antenna and stay within the required width restrictions.

Figure 2A:
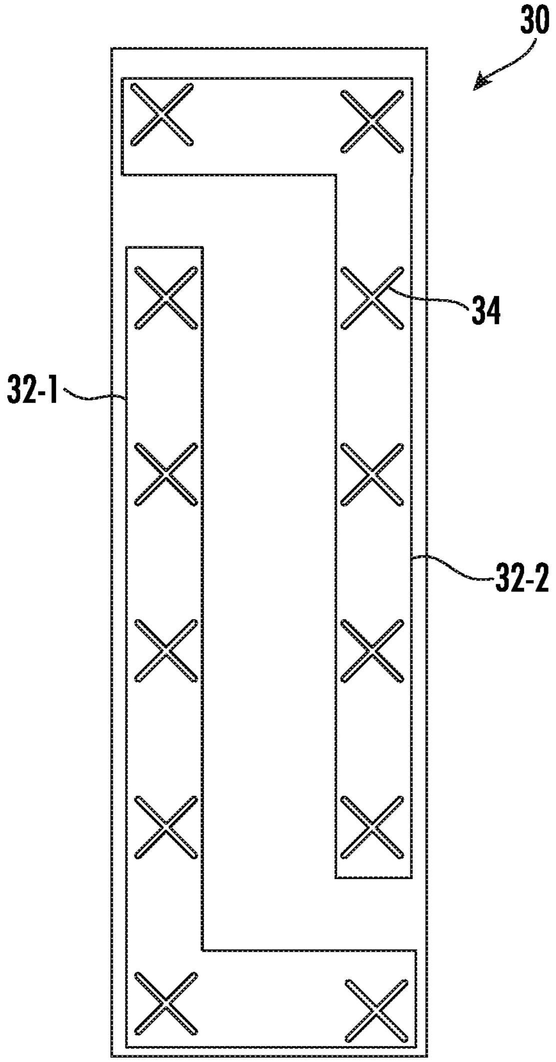
FIG. 2A (PRIOR ART)
FIGS. 2A-2C are schematic front views of several conventional base station antennas (with the radome thereof removed) that have arrays of dual-polarized cross-dipole radiating elements that have increased horizontal apertures that narrow the azimuth beamwidth.
Figure 2B:
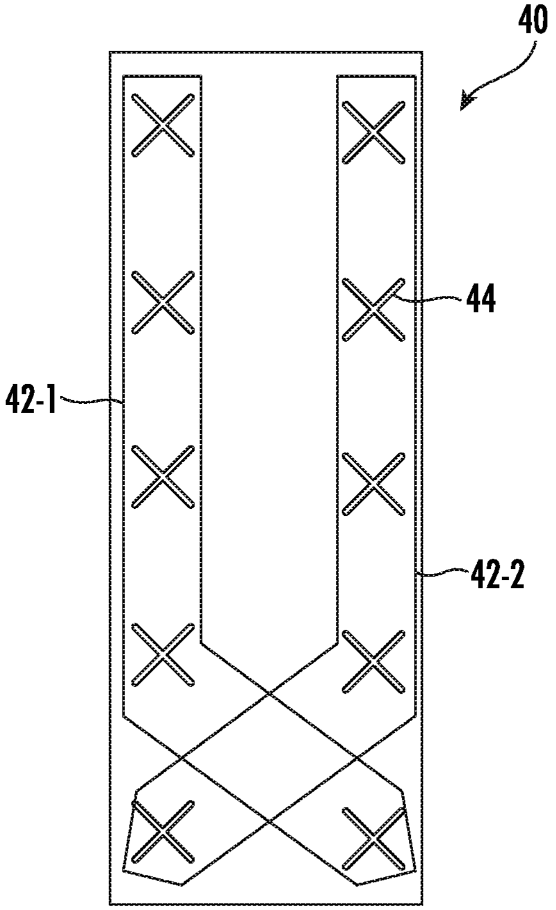
FIG. 2B (PRIOR ART)
Figure 2C:
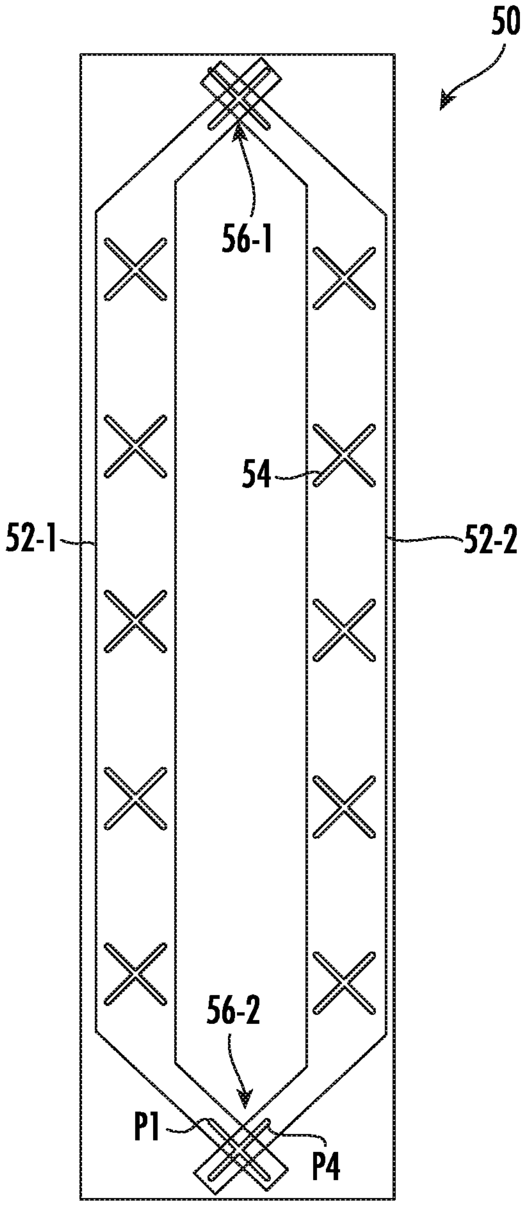
FIG. 2C (PRIOR ART)

Pursuant to further embodiments of the present invention, the antennas illustrated in FIGS. 2A-2C may be modified to include the low-band radiating elements according to embodiments of the present invention that include passive or active directors. Since two separate techniques are used in such antennas (i.e., both staggering the radiating elements in the horizontal direction and adding directors to the radiating elements) to narrow the azimuth HPBW, it is possible to implement 498 mm wide base station antennas having two linear arrays of low-band radiating elements that generate antenna beams having azimuth HPBWs of 33° and 430 mm wide base station antennas having two linear arrays of low-band radiating elements that generate antenna beams having azimuth HPBWs of 45°. In particular, FIG. 8A illustrates one such base station antenna 400 that includes two L-shaped low-band linear arrays of radiating elements according to embodiments of the present invention. The narrowed azimuth beamwidth provided by the passive or active directors in combination with the L-shaped array may allow the azimuth HPBW to be narrowed to, for example, 45°.

Figure 8B:
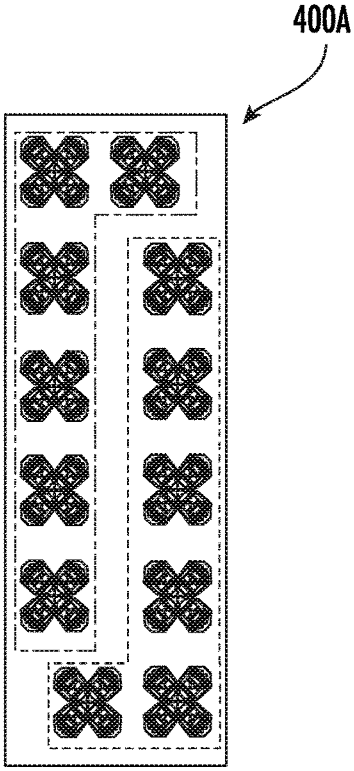
Figure 8C:
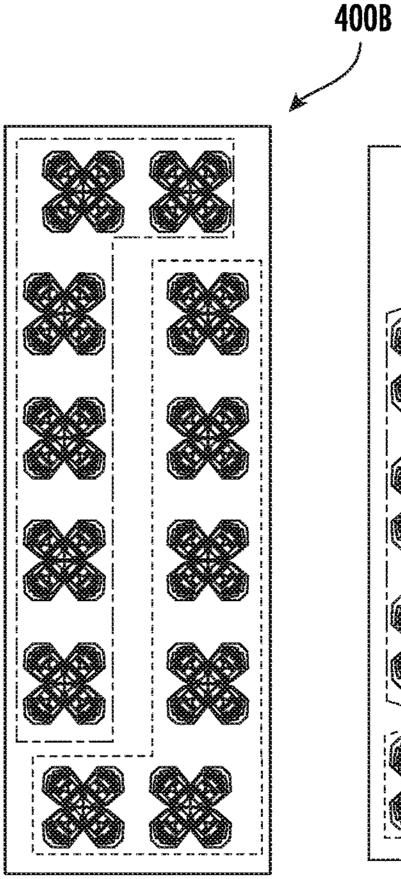
Figure 8D:
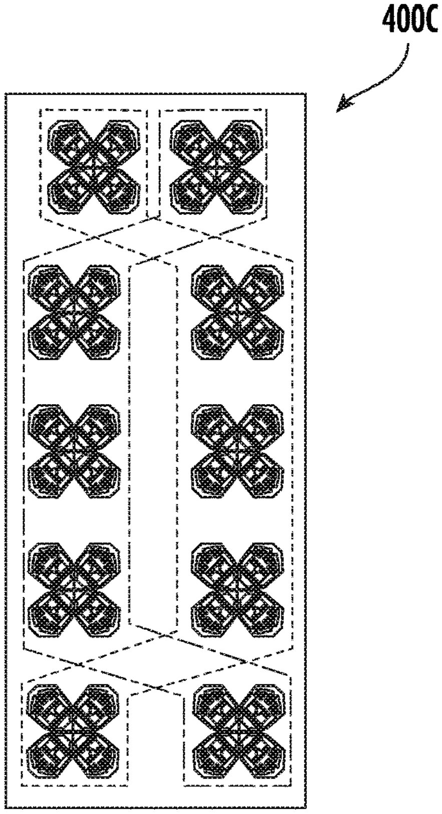
Figure 8E:
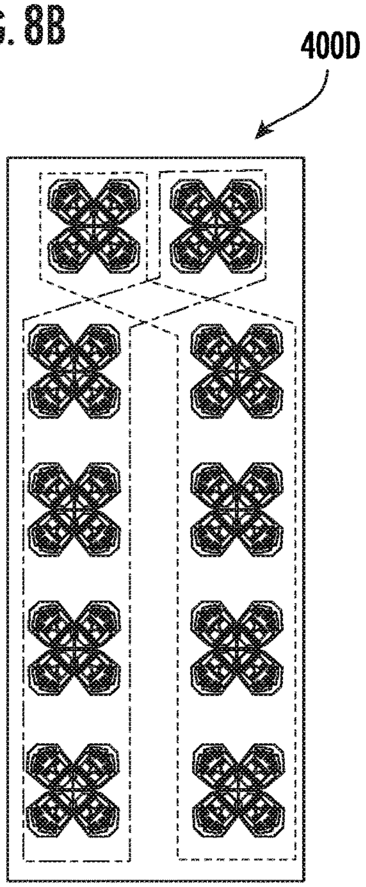

FIGS. 8B-8E illustrate base station antennas 400A-400D according to further embodiments of the present invention that are modified versions of base station antenna 400 of FIG. 4A. As shown in FIGS. 8B and 8C, in base station antennas 400A and 400B the horizontal positions of the radiating elements on the ends of each column are adjusted to achieve a desired azimuth beamwidth. FIG. 8D illustrates another example base station antenna 400C in which the radiating elements at both the top and bottom of each column are members of the array formed by the middle radiating elements in the other column. Finally, FIG. 8E illustrates a base station antenna 400D in which the radiating elements according to embodiments of the present invention are used on a Y-shaped array arrangement.

L-shaped and/or Y-shaped arrays may also be used to generate antenna beams having widened azimuth beamwidths. In particular, as discussed in U.S. patent application No. Ser. No. 17/526,030, filed Nov. 15, 2021 ("the '030 application"), arrays that include first a column of radiating elements and an additional "auxiliary" radiating element that is horizontally offset from the first column of radiating elements may generate antenna beams having widened azimuth HPBWs, such as azimuth HPBWs of 85° or 90°, if the auxiliary radiating element is fed substantially in antiphase to the radiating elements in the first column of radiating elements. Here, the term "substantially in antiphase" may refer to a phase difference between two signals that is 180° or that deviates from 180° by less than 20°. The first column of radiating elements and the auxiliary radiating element may, for example, together form an L-shaped array or a Y-shaped array. The entire content of the '030 application is incorporated herein by reference as if set forth fully herein.

Simulations show that using the low-band radiating elements according to embodiments of the present invention that have passive or active directors in L-shaped or Y-shaped arrays in which the horizontally offset auxiliary radiating element is fed substantially in antiphase as compared to the remaining radiating elements in the array may achieve a very stable azimuth HPBW (e.g., variation of less than 5.5° over the full 696-960 frequency range) and good front to back ratio with low sidelobes.

Figure 9A:
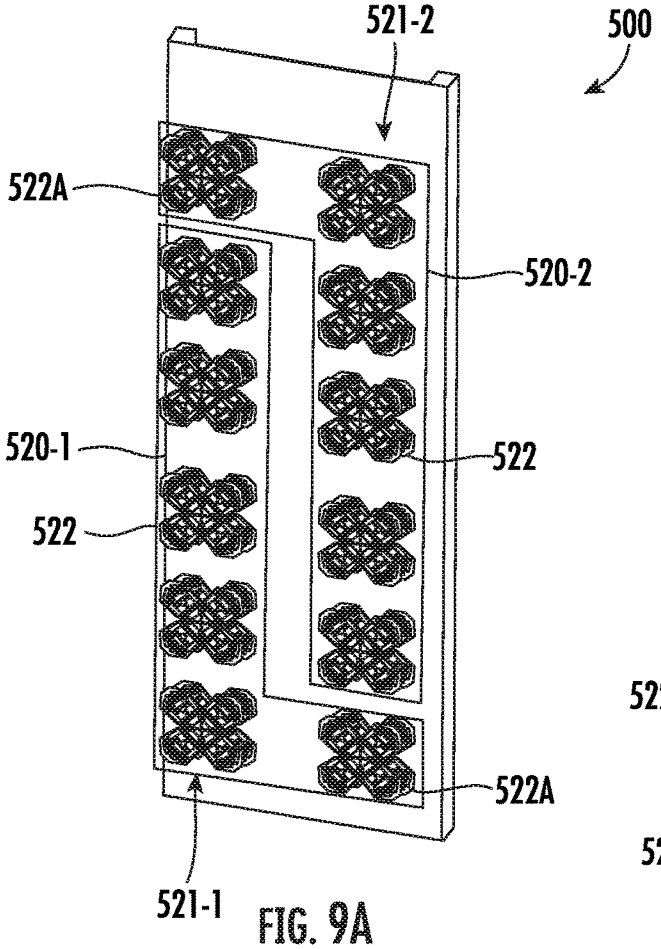
FIG. 9A is a schematic front perspective view of a base station antenna according to embodiments of the present invention that includes a pair of L-shaped arrays that each have an auxiliary radiating element that is fed antiphase to the remaining elements of the respective arrays.
Figure 9B:
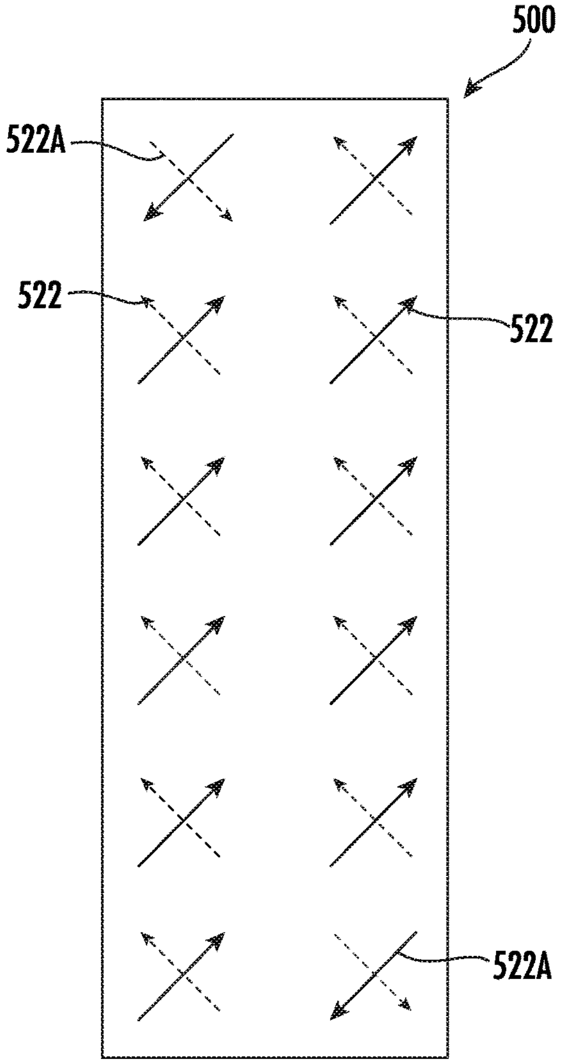
FIG. 9B is a schematic front view of the base station antenna of FIG. 9A that illustrates how the auxiliary radiating elements are rotated relative to the remaining radiating elements in the L-shaped arrays.

FIG. 9A is a schematic front view of a base station antenna 500 according to embodiments of the present invention that includes a pair of L-shaped arrays that each have an auxiliary radiating element that is fed antiphase to the remaining elements of the respective arrays. As can be seen, base station antenna 500 may appear identical to base station antenna 400 of FIG. 8A. In particular, base station antenna 500 includes a first column 521-1 of five low-band radiating elements 522 and a sixth horizontally offset auxiliary radiating element 522A-1 that together form a first L-shaped array 520-1, as well as a second column 521-2 of five low-band radiating elements 522 and a sixth horizontally offset auxiliary radiating element 522A-2 that together form a second L-shaped array 520-2. As shown in FIG. 9B, each auxiliary radiating element 522A may be rotated 180° with respect to the other radiating elements 520. As a result, each radiating element 522 in an array 520 is fed with subcomponents of the RF signal to be transmitted that have a first phase, and the auxiliary radiating element 522A of the array 520 is fed with a subcomponent of the RF signal that is 180° out-of-phase with the other subcomponents.

While the embodiments of the present invention discussed above include active r passive directors that are mounted forwardly of the active dipole radiators, it will be appreciated that embodiments of the present invention are not limited thereto. In particular, in other embodiments, the active or passive director printed circuit board may be positioned behind the active dipole radiators (i.e., between the active dipole radiators and the reflector). In this position, the active or passive director acts like a reflector as opposed to a director, and can once again be designed to increase the directivity of the radiating element. While this approach advantageously does not increase the "height" of the low-band radiating elements (i.e., how far they extend forwardly), in practice it may often be difficult to mount active or passive reflectors behind the active dipole radiators because mid-band radiating elements that are overlap the low-band radiating elements may occupy the same space required for the reflectors.

While the dipole arms of the low-band radiating elements described above are implemented on one or more dipole radiator printed circuit boards, it will be appreciated that embodiments of the present invention are not limited thereto. For example, in other embodiments, any of the above-described radiating elements may be implemented using sheet metal dipole arms that are mounted on a dielectric support. In such embodiments, the dipole arms may be formed by stamping the appropriately shaped structures from sheet metal.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A base station antenna, comprising:

a reflector;

a first linear array of lower-band radiating elements mounted to extend forwardly from the reflector, the lower-band radiating elements configured to transmit and receive radio frequency ("RF") signals in a first frequency band; and a second linear array of higher-band radiating elements mounted to extend forwardly from the reflector, the higher-band radiating elements configured to transmit and receive RF signals in a second frequency band that is at higher frequencies than the first frequency band, wherein a first of the lower-band radiating elements includes first and second dipole radiators and a director mounted forwardly of the first and second dipole radiators, wherein both the first and second dipole radiators and the director are cloaked using resonant circuits to reduce or eliminate scattering of RF energy emitted by the higher-band radiating elements, and wherein the director comprises a first dipole arm and a second dipole arm.

2. The base station antenna of claim 1, wherein the first of the lower-band radiating elements comprises a feed stalk, and the first and second dipole radiators comprise a −45° polarization dipole radiator and a +45° polarization dipole radiator that form a cross-dipole radiator that is mounted on the feed stalk.

3. The base station antenna of claim 2, further comprising a lower-band feed network that couples a first RF port and a second RF port to each of the lower-band radiating elements in the first linear array, wherein the director is a passive director that is not coupled to the lower-band feed network.

4. The base station antenna of claim 2, further comprising a lower-band feed network that couples a first RF port and a second RF port to each of the lower-band radiating elements in the first linear array, wherein the director is an active director that includes a −45° polarization dipole radiator and a +45° polarization dipole radiator that are each coupled to the lower-band feed network.

5. A base station antenna, comprising:

a reflector;

a first linear array of lower-band radiating elements mounted to extend forwardly from the reflector, the lower-band radiating elements configured to transmit and receive radio frequency ("RF") signals in a first frequency band; and a second linear array of higher-band radiating elements mounted to extend forwardly from the reflector, the higher-band radiating elements configured to transmit and receive RF signals in a second frequency band that is at higher frequencies than the first frequency band, wherein a first of the lower-band radiating elements includes first and second dipole radiators and a director mounted forwardly of the first and second dipole radiators, wherein both the first and second dipole radiators and the director are cloaked using resonant circuits to reduce or eliminate scattering of RF energy emitted by the higher-band radiating elements, wherein the first of the lower-band radiating elements comprises a feed stalk, and the first and second dipole radiators comprise a −45° polarization dipole radiator and a +45° polarization dipole radiator that form a cross-dipole radiator that is mounted on the feed stalk, wherein the feed stalk extends through a central portion of the cross-dipole radiator, and the director is mounted on the feed stalk.

6. The base station antenna of claim 2, wherein the director is mounted forwardly of the cross-dipole radiator by at least $\frac{1}{8}^{th}$ of a wavelength corresponding to a center frequency of the first frequency band.

7. The base station antenna of claim 6, wherein the director is mounted forwardly of the cross-dipole radiator by no more than $\frac{1}{4}^{th}$ of the wavelength corresponding to the center frequency of the first frequency band.

8. The base station antenna of claim 2, wherein a shape of the director is substantially the same as a shape of the cross-dipole radiator.

9. The base station antenna of claim 2, wherein the director is configured to narrow azimuth beamwidths of antenna beams generated by the cross-dipole radiator.

10. The base station antenna of claim 2, wherein the cross-dipole radiator is formed on a first dipole radiator printed circuit board and the director is formed on a second dipole radiator printed circuit board.

11. The base station antenna of claim 1, further comprising a third linear array of lower-band radiating elements mounted to extend forwardly from the reflector and configured to transmit and receive RF signals in the first frequency band, wherein the lower-band radiating elements of the first and third linear arrays of lower-band radiating elements are arranged in first and second vertically-extending columns, with all but a last of the lower-band radiating elements in the first vertical column and a last of the lower-band radiating elements in the second vertical column constituting the first linear array of lower-band radiating elements, and all but the last of the lower-band radiating elements in the second vertical column and the last of the lower-band radiating elements in the first vertical column constituting the third linear array of lower-band radiating elements.

12. The base station antenna of claim 1, wherein the first frequency band comprises the 617-960 MHz frequency band or a portion thereof, and the second frequency comprises the 1427-2690 MHz frequency band or a portion thereof.

13. A base station antenna, comprising:

a reflector;

a first column of lower-band radiating elements mounted to extend forwardly from the reflector, the lower-band radiating elements configured to transmit and receive radio frequency ("RF") signals in a first frequency band;

a second column of lower-band radiating elements mounted to extend forwardly from the reflector;

a third column of higher-band radiating elements mounted to extend forwardly from the reflector, the higher-band radiating elements configured to transmit and receive RF signals in a second frequency band that is at higher frequencies than the first frequency band;

a first RF port; and a second RF port, wherein the lower-band radiating elements in the first column and at least a first additional lower-band radiating element form a first array of lower-band radiating elements, each of the lower-band radiating elements in the first array of lower-band radiating elements coupled to the first RF port, and wherein the lower-band radiating elements in the second column and at least a second additional lower-band radiating element form a second array of lower-band radiating elements, each of the lower-band radiating elements in the second array of lower-band radiating elements coupled to the second RF port, wherein a first of the lower-band radiating elements includes first and second dipole radiators and a director mounted forwardly of the first and second dipole radiators, wherein both the first and second dipole radiators and the director are cloaked using resonant circuits to reduce or eliminate scattering of RF energy emitted by the higher-band radiating elements.

14. The base station antenna of claim 13, wherein the first additional lower-band radiating element is closer to a second vertical axis defined by the second column of lower-band radiating elements than it is a first vertical axis defined by the first column of lower-band radiating elements, and the second additional lower-band radiating element is closer to the first vertical axis than it is the second vertical axis.

15. The base station antenna of claim 13, wherein the first additional lower-band radiating element is positioned above or below the second column of lower-band radiating elements, and the second additional lower-band radiating element is positioned above or below the first column of lower-band radiating elements.

16. The base station antenna of claim 13, wherein the first additional lower-band radiating element is aligned along the second vertical axis, and the second additional lower-band radiating element is aligned along the first vertical axis.

17. The base station antenna of claim 13, wherein the first additional lower-band radiating element is fed substantially in antiphase with respect to the lower-band radiating elements in the first column.

18. The base station antenna of claim 17, wherein the first array of lower-band radiating elements is an L-shaped array of radiating elements.

19. The base station antenna of claim 17, wherein the first array of lower-band radiating elements is a Y-shaped array of radiating elements.

20. The base station antenna of claim 17, wherein the first additional lower-band radiating element is rotated 180° with respect to the lower-band radiating elements in the first column.

* * * * *